United States Patent
Tseng et al.

(10) Patent No.: US 11,337,126 B2
(45) Date of Patent: May 17, 2022

(54) MULTI-RAT SIDELINK COMMUNICATIONS

(71) Applicant: FG Innovation Company Limited, Tuen Mun (CN)

(72) Inventors: Yung-Lan Tseng, Hsinchu (TW); Mei-Ju Shih, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/589,507

(22) Filed: Oct. 1, 2019

(65) Prior Publication Data

US 2020/0107236 A1   Apr. 2, 2020

Related U.S. Application Data

(60) Provisional application No. 62/740,109, filed on Oct. 2, 2018.

(51) Int. Cl.
*H04W 36/08* (2009.01)
*H04W 76/27* (2018.01)
*H04W 72/04* (2009.01)
*H04W 4/40* (2018.01)
(Continued)

(52) U.S. Cl.
CPC ............ *H04W 36/08* (2013.01); *H04W 4/40* (2018.02); *H04W 72/042* (2013.01); *H04W 72/14* (2013.01); *H04W 76/27* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 2016/0028572 A1* | 1/2016 | Suzuki | H04W 8/005 |
| | | | 370/281 |
| 2017/0150490 A1 | 5/2017 | Chen et al. | |
| 2017/0339689 A1 | 11/2017 | Lee et al. | |

(Continued)

FOREIGN PATENT DOCUMENTS

CN    104854938 A    8/2015

OTHER PUBLICATIONS

Nokia Networks R2-154147, Considerations of V2X implications to RAN operation 3GPP TSG-RAN WG2 meeting #91 bis Oct. 9, 2015(Oct. 9, 2015) the whole document.

*Primary Examiner* — Hong Shao
(74) *Attorney, Agent, or Firm* — ScienBiziP, P.C.

(57) ABSTRACT

Some of the present implementations provide a method for a first user equipment (UE) to exchange sidelink packets with at least a second UE. The method receives, through a first interface and via a radio resource control (RRC) signaling, a sidelink configuration from a first base station during a handover procedure of the first UE to a second base station. The method then exchanges, through a second interface, one or more sidelink packets with the second UE based on the sidelink configuration received from the first base station and previously stored sidelink configuration at the first UE. The first interface is configurable to be one of a long term evolution (LTE) Uu interface and a new radio (NR) Uu interface, and the second interface is configurable to be one of an LTE proximity service (ProSe) sidelink PC5 interface and an NR ProSe sidelink PC5 interface.

20 Claims, 15 Drawing Sheets

(51) Int. Cl.
*H04W 72/14* (2009.01)
*H04W 92/18* (2009.01)

(56) References Cited

U.S. PATENT DOCUMENTS

| | | | |
|---|---|---|---|
| 2018/0115930 A1* | 4/2018 | Belleschi | H04W 36/0072 |
| 2018/0139724 A1* | 5/2018 | Loehr | H04W 72/02 |
| 2019/0239186 A1* | 8/2019 | Tugnawat | H04W 68/02 |

* cited by examiner

MULTI-RAT SIDELINK COMMUNICATIONS

CROSS-REFERENCE TO RELATED APPLICATION(S)

The present application claims the benefit of and priority to a provisional U.S. Patent Application Ser. No. 62/740,109, filed on Oct. 2, 2018, entitled "Inter-RAT Sidelink Enhancements,". The disclosure of the US75137 application is hereby incorporated fully by reference into the present application.

FIELD

The present disclosure generally relates to wireless communications, and more particularly, to multi-Radio Access Technology (RAT) sidelink communication between a first User Equipment (UE) and a second UE in the next generation wireless networks.

BACKGROUND

In New Radio (NR), a UE may exchange sidelink data (e.g., user data and control signaling) with other UEs directly and without the help (e.g., relaying) of a base station. In order to perform sidelink operations, however, the UE needs to receive the sidelink configuration (e.g., resource allocation, frequency carrier, etc.) from a base station beforehand. A UE may receive the sidelink configuration from a base station (e.g., from one or more cells associated with an eNB, or a gNB) for configuring an interface associated with the UE (e.g., a PC5 interface) to exchange sidelink packets with other UEs. The interface through which the UE receives the sidelink configuration and the interface through which the UE communicates the sidelink data with the other UEs are, however, conventionally associated with the same radio access technology (RAT), such as long term evolution (LTE) and new radio (NR).

SUMMARY

The present disclosure is directed to multi-RAT sidelink communication in the next generation wireless networks.

In a first aspect of the present application, a method for a first UE to exchange sidelink packets with at least a second UE is provided. The method comprises receiving, at the first UE, via a radio resource control (RRC) signaling, through a first interface, a sidelink configuration from a first base station during a handover procedure to a second base station; and exchanging, through a second interface, one or more sidelink packets with the second UE based on the sidelink configuration received from the first base station and previously stored sidelink configuration at the first UE, wherein the first interface is configurable to be one of a long term evolution (LTE) Uu interface and a new radio (NR) Uu interface, and the second interface is configurable to be one of an LTE proximity service (ProSe) sidelink PC5 interface and an NR ProSe sidelink PC5 interface.

In an implementation of the first aspect, the sidelink configuration comprises one or more Type 1 sidelink configured grant configurations comprising at least one of a time periodicity and locations of physical resource blocks in time and frequency domains, wherein exchanging the one or more sidelink packets with the second UE comprises transmitting sidelink packets to the second UE using a configured Type 1 sidelink configured grant after receiving the sidelink configuration from the first base station successfully.

In another implementation of the first aspect, the sidelink configuration comprises one or more Type 2 sidelink configured grant configurations comprising at least a time periodicity in a time domain.

Another implementation of the first aspect further comprises receiving a downlink control information (DCI) message from the second base station to activate at least a configured Type 2 sidelink configured grant received in the sidelink configuration, wherein the DCI message comprises locations of physical resource blocks in time and frequency domains at the first interface, wherein exchanging the one or more sidelink packets with the second UE comprises transmitting sidelink packets to the second UE using the activated Type 2 sidelink configured grant.

In another implementation of the first aspect, the sidelink configuration comprises one or more sidelink Transmission (Tx) resource pool configurations, wherein exchanging the one or more sidelink packets with the second UE comprises transmitting sidelink packets to the second UE using a configured sidelink Tx resource pool after the first UE handovers to the second base station successfully.

Another implementation of the first aspect further comprises modifying at least part of the previously stored sidelink configuration at the first UE based on the sidelink configuration received from the first base station; and storing the modified sidelink configuration at the first UE, as a most recently updated sidelink configuration.

Another implementation of the first aspect further comprises exchanging, by the first UE, data and control signaling with the first base station and the second base station through different interfaces configured with different radio access technologies (RATs) comprising at least an LTE RAT and an NR RAT.

In a second aspect of the present application, first UE is provided. The UE comprises one or more non-transitory computer-readable media having computer-executable instructions for exchange sidelink packets with at least a second UE; and at least one processor coupled to the one or more non-transitory computer-readable media, and configured to execute the computer-executable instructions to: receive, at the first UE, via a radio resource control (RRC) signaling, through a first interface, a sidelink configuration from a first base station during a handover procedure to a second base station; and exchange, through a second interface, one or more sidelink packets with the second UE based on the sidelink configuration received from the first base station and previously stored sidelink configuration at the first UE, wherein the first interface is configurable to be one of a long term evolution (LTE) Uu interface and a new radio (NR) Uu interface, and the second interface is configurable to be one of an LTE proximity service (ProSe) sidelink PC5 interface and an NR ProSe sidelink PC5 interface.

In an implementation of the second aspect, the sidelink configuration comprises one or more Type 1 sidelink configured grant configurations comprising at least one of a time periodicity and locations of physical resource blocks in time and frequency domains, wherein executing the computer-executable instructions to exchange the one or more sidelink packets with the second UE comprises executing the computer-executable instructions to transmit sidelink packets to the second UE using a configured Type 1 sidelink configured grant after receiving the sidelink configuration from the first base station successfully.

In another implementation of the second aspect, the sidelink configuration comprises one or more Type 2 sidelink configured grant configurations comprising at least a time periodicity in a time domain.

In another implementation of the second aspect, the at least one processor is further configured to execute the computer-executable instructions to: receive a downlink control information (DCI) message from the second base station to activate at least a configured Type 2 sidelink configured grant received in the sidelink configuration, wherein the DCI message comprises locations of physical resource blocks in time and frequency domains at the first interface, wherein executing the computer-executable instructions to exchange the one or more sidelink packets with the second UE comprises executing the computer-executable instructions to transmit sidelink packets to the second UE using the activated Type 2 sidelink configured grant.

In another implementation of the second aspect, the sidelink configuration comprises one or more sidelink Transmission (Tx) resource pool configurations, wherein executing the computer-executable instructions to exchange the one or more sidelink packets with the second UE comprises executing the computer-executable instructions to transmit sidelink packets to the second UE using a configured sidelink Tx resource pool after the first UE handovers to the second base station successfully.

In another implementation of the second aspect, the at least one processor is further configured to execute the computer-executable instructions to: modify at least part of the previously stored sidelink configuration at the first UE based on the sidelink configuration received from the first base station; and store the modified sidelink configuration at the first UE, as a most recently updated sidelink configuration.

In another implementation of the second aspect, the at least one processor is further configured to execute the computer-executable instructions to: exchange, by the first UE, data and control signaling with the first base station and the second base station through different interfaces configured with different radio access technologies (RATs) comprising at least an LTE RAT and an NR RAT.

In a third aspect of the present application, a method for a first base station for configuring a first UE to exchange sidelink packets with at least a second UE is provided. The method comprises transmitting, from the first base station, via a radio resource control (RRC) signaling, through a first interface, a sidelink configuration to the first UE during a handover procedure of the first UE from the first base station to a second base station, wherein the sidelink configuration, along with previously stored sidelink configuration at the first UE, configures the first UE to exchange, through a second interface, one or more sidelink packets with the second UE, wherein the first interface is configurable to be one of a long term evolution (LTE) Uu interface and a new radio (NR) Uu interface, and the second interface is configurable to be one of an LTE proximity service (ProSe) sidelink PC5 interface and an NR ProSe sidelink PC5 interface.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
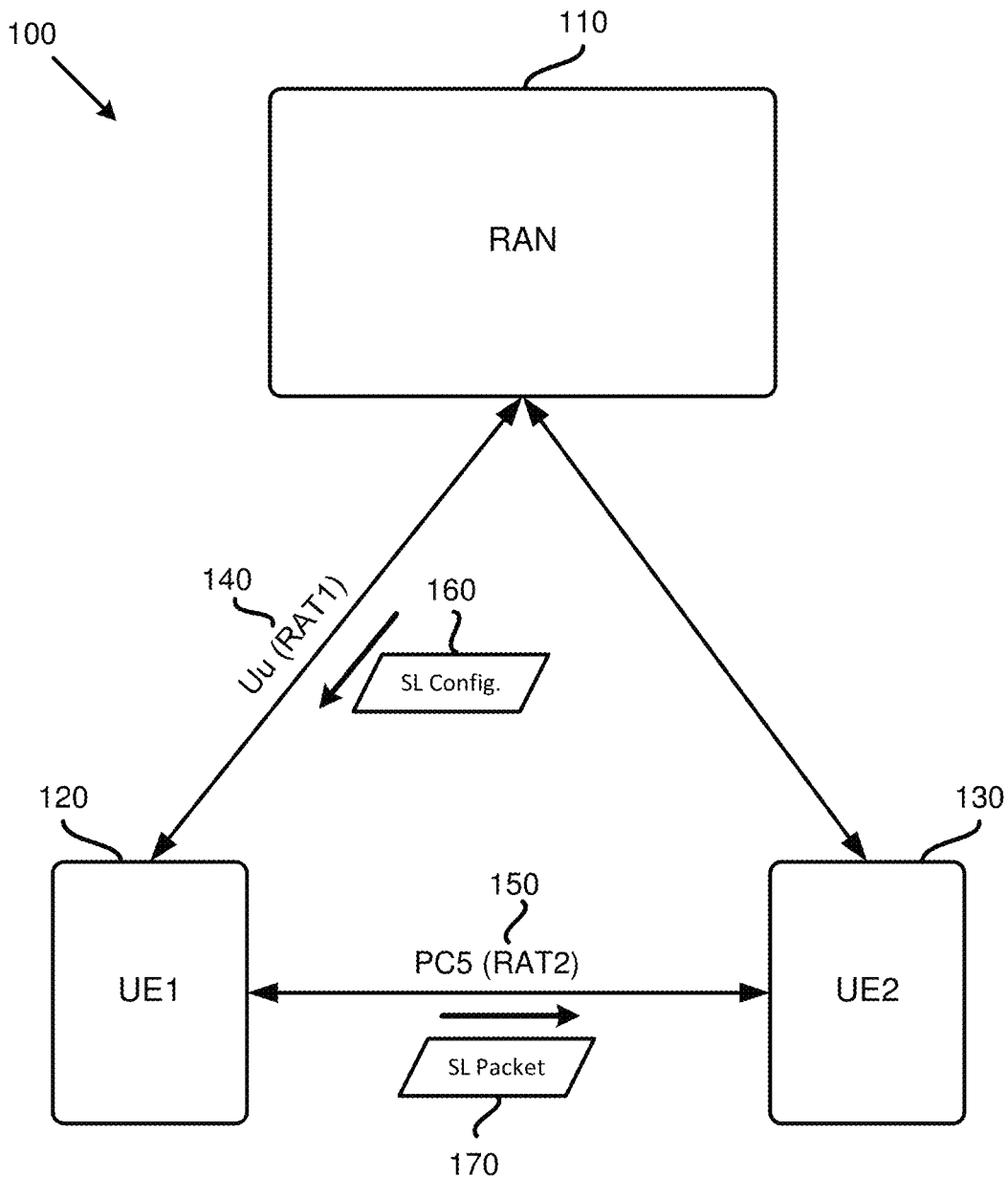
FIG. 1 is a diagram illustrating a UE receiving configuration data for sidelink communication through an interface configured with a first RAT, and communicating with another UE based on the received configuration through another interface configured with a second RAT, according to one example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station may communicate with one or more UEs in the radio communication system through the plurality of cells. A cell may allocate sidelink (SL) resources for supporting Proximity Service (ProSe) or Vehicle to Everything (V2X) services. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the Multi-RAT Dual Connectivity (MR-DC) mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell which may be the primary cell. Conversely, for a UE in the RRC_CONNECTED state that is configured with the CA/DC a set of serving cells including the special cell(s) and all of the secondary cells may communicate with the UE.

In some of the present implementations, an NR Uu interface established between a UE and a base station (e.g., a gNB) may manage an LTE PC5 interface (e.g., a ProSe sidelink PC5 interface) associated with the UE (e.g., by configuring RRC configurations on the LTE PC5 interface). Conversely, in some aspects of the present implementations, an LTE Uu interface established between a UE and a base station (e.g., an eNB) may manage an NR PC5 interface (e.g., a ProSe sidelink PC5 interface) of the UE (e.g., by configuring RRC configurations on the NR PC5 interface). In some of the present implementations, a Uu interface (e.g., and NR Uu) may configure the PC5 interface of the UE to exchange sidelink packets with other UEs through an LTE PC5 interface and/or an NR PC5 interface. In some of the present implementations, the multi-RAT (e.g., NR/LTE) sidelink configuration may be implemented in a dual connectivity framework, while in other aspects of the present implementations, the sidelink configuration may be implemented in a single connectivity scenario (without any secondary cells). In some aspects of the present implementations, a UE may be configured with multi-RAT sidelink configuration while the UE is performing a hand over procedure to transition from a source cell (or base station) to a target cell (or base station).

In some of the present implementations, the NR network may provide the necessary semi-static configurations for the LTE sidelink (SL) communication. For controlling the LTE SL Semi-Persistent Scheduling (SPS) transmissions when the UE has the relevant capability, an RRC message in Uu interface may deliver and release the SPS grant configuration. In some aspects of the present implementations, however, a base station may configure sidelink radio resources dynamically. In some of the present implementations, to dynamically configure a UE with multi-RAT sidelink configurations, the base station may deliver the configuration message(s) via dedicated control signaling (e.g., one or more downlink control information (DCI) messages). In some of the present implementations, the dynamic multi-RAT sidelink configuration may be implemented in a dual connectivity architecture. In some of such implementations, an SN may provide the multi-RAT sidelink configuration to the UE.

It should be noted that the multi-RAT sidelink configuration described in the present implementations may not be limited to an NR cell (e.g., through an NR Uu) configuring the NR and/or LTE sidelink configuration to a UE. In other words, the same (or similarly) described implementations may apply to an NR cell configuring an NR sidelink configuration to a UE, an NR cell configuring an LTE sidelink configuration to a UE, an LTE cell configuring the NR sidelink configuration to a UE, and an LTE cell configuring an LTE sidelink configuration to a UE. Additionally, in a dual connectivity scenario, the multi-RAT sidelink configuration of some of the present implementations may not be limited to the LTE-V2X configuration and/or NR-V2X configuration that are only applicable to an NE-DC (NR-E-UTRA Dual Connectivity) scenario. In other words, both of the described LTE-V2X-SCG configuration and NR-V2X-SCG configuration may equally be applicable to all different MR-DC scenarios.

FIG. 1 is a diagram 100 illustrating a UE receiving configuration data for sidelink communication through an interface configured with a first RAT, and communicating with another UE based on the received configuration through another interface configured with a second RAT, according to one example implementation of the present application. The diagram 100 includes a RAN 110, a first UE (UE1) 120, and a second UE (UE2) 130. The RAN 110, in some of the present implementations, may include a (wireless) network established between at least one base station (not shown in the figure) and the two UEs 120 and 130.

As shown in FIG. 1, the UE 120 may receive a sidelink configuration 160 through a Uu interface 140 of a first RAT (e.g., an NR Uu). After receiving the sidelink configuration 160, the UE 120 may construct (or configure) a PC5 interface 150 of a second RAT (e.g., an LTE PC5 or an NR PC5) based on the received configuration to communicate with the UE 130. In FIG. 1, as illustrated, after the PC5 interface 150 of a second RAT is configured, the UE 120 may transmit a second RAT sidelink packet(s) 170 to the UE 130 through the configured PC5 interface 150.

In some of the present implementations, each of the first and second RATs may be one of an LTE RAT and an NR RAT. Additionally, the PC5 interface 150, in some of the present implementations, may be a ProSe sidelink PC5 interface. In some of the present implementations, as described in more detail below, the sidelink configuration 160 may include one or more Type 1 and/or Type 2 sidelink configured grant configurations. The Type 1 configured grant configuration, in some of the present implementations, may include a time periodicity and/or locations of physical resource blocks in the time domain and the frequency domain. The Type 2 configured grant configuration, in some of the present implementations, may include a time periodicity in the time domain. In some of the present implementations, the UE 120 may transmit the sidelink packet(s) 170 to the UE 130 using a configured Type 1 (or Type 2) sidelink configured grant after receiving the sidelink configuration 160 from the RAN 110.

In some of the present implementations, the UE 120 may receive the sidelink configuration 160, while the UE 120 is performing a handover procedure (e.g., to transition from a source cell (or base station) to a target cell (or base station)). In some of such implementations, the sidelink configuration 160 may include one or more sidelink Transmission (Tx) resource pool configurations. In some of the present implementations, the UE 120 may transmit the sidelink packet(s) 170 to the UE 130 using one or more configured sidelink Tx resource pool(s) after the UE 120 handovers to the target cell successfully.

Figure 2:
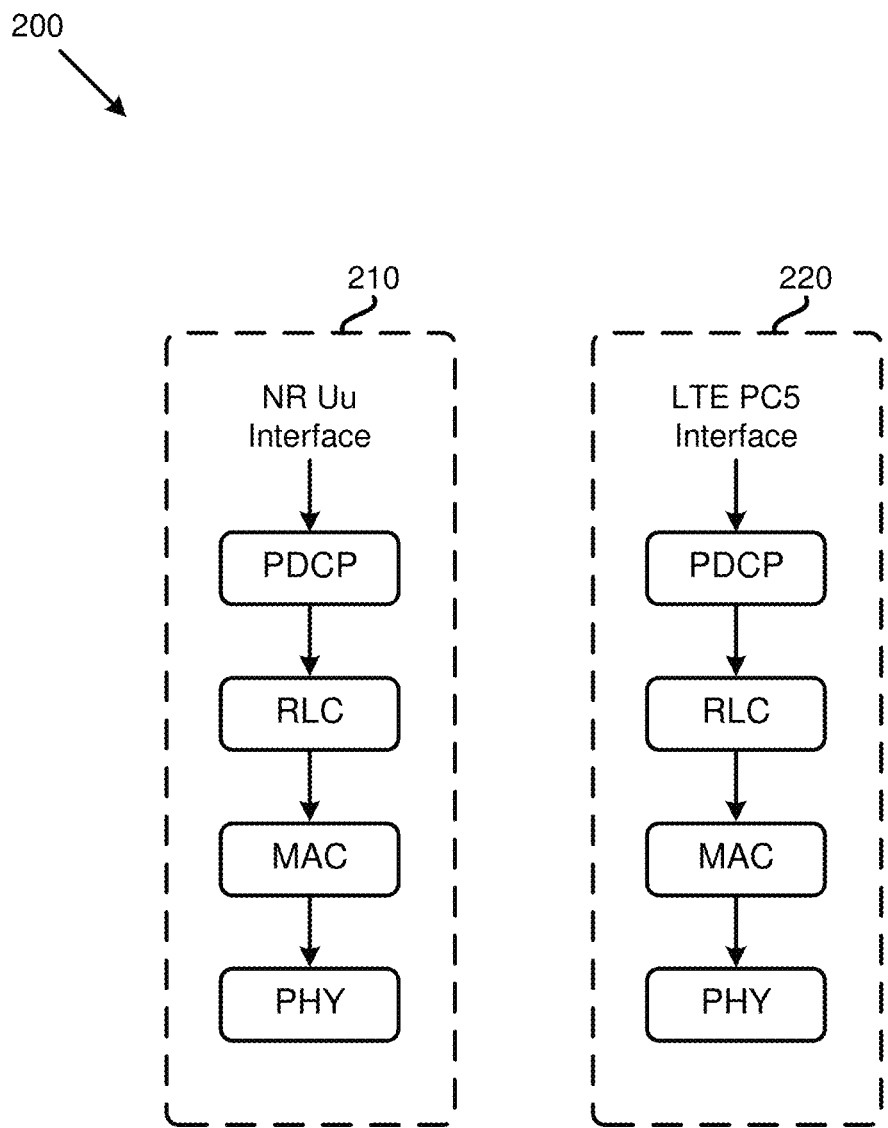
FIG. 2 is a schematic architecture illustrating different sidelink configurations for an LTE-V2X service supported by an NR Uu interface, according to one example implementation of the present application.

FIG. 2 is a schematic architecture 200 illustrating different sidelink configurations for an LTE-V2X service supported by an NR Uu interface, according to one example implementation of the present application. As illustrated, FIG. 2 includes an NR Uu configuration 210 and an LTE PC5 configuration 220. In some of the present implementations, a serving cell may provide sidelink configuration for a Uu interface and a PC5 interface through dedicated control signaling. For example, in a DC architecture, an NR cell may provide an MCG configuration for an NR Uu interface, as well as one or more LTE-V2X SCG configurations for an LTE PC5 interface, for example, through an RRCConnectionReconfiguration message, based on the NR protocol. The sidelink configuration may include configurations for the UE to realize the LTE PC5 interface. As shown in FIG. 2, in some of the present implementations, the sidelink configuration may provide an LTE-PDCP layer configuration, an LTE-RLC layer configuration, an LTE-MAC layer configuration, and an LTE-Physical (PHY) layer configuration to the PDCP layer, RLC layer, MAC layer and PHY layer of the UE, respectively.

As described above, after receiving the sidelink configuration (e.g., LTE-V2X configuration), a UE may construct the LTE PC5 interface based on the received sidelink configuration. In some of the present implementations, in a DC platform, the LTE-V2X SCG configuration may include no PSCell configuration. In some of such implementations, a Global Navigation Satellite System (GNSS) may be configured as the synchronization reference for the LTE-V2X service. In some of these implementations, an LTE cell may be configured (e.g., by an SN, such as an LTE eNB) as the PSCell (or a reference cell for LTE-V2X sidelink communication transmission) in the LTE V2X SCG. In some of such implementations, the PSCell may be responsible to configure the sidelink resources to the UE (e.g., by following the LTE-V2X protocols). In some other implementations, a gNB may select an LTE cell as the PSCell in the LTE-V2X-SCG configuration based on a downlink (DL) measurement report received from the UE.

In some of the present implementations, some of the LTE-V2X configuration criteria may be modified for the UE to realize an LTE-V2X service using an NR interface. These criteria may include, but are not limited to, the allowed synchronization reference, the applicable area, the different (NR) RRC states (e.g., Connected, Inactive, Idle), etc.

For example, an LTE-V2X UE may select a synchronization reference based on the given synchronization references, such as an eNB, a GNSS, or another UE. In some of the present implementations, for an NR scenario (e.g., an NR standalone scenario where there is no nearby LTE-RAN for the UE), the multi-RAT configuration may configure a GNSS or an LTE-UE as an allowed synchronization reference. As a result, it is possible that no PSCell is indicated in the multi-RAT SL configuration. It should be noted that the LTE-UE synchronization reference may be a SyncRef UE that broadcasts Sidelink Synchronization Signal/Master Information Block (SLSS/MIB-SL) periodically (e.g., according to LTE-V2X platforms defined in a 3GPP specification) in some of the present implementations.

In some of the present implementations, when the UE is also under the coverage of an LTE-RAN, an eNB may also be configured as one of the allowed synchronization references. That is, an LTE cell may be configured as a PSCell (or a reference cell for LTE-V2X sidelink communication transmission) to coordinate the LTE-V2X services. In some of the present implementations, a gNB may not be configured as an allowed synchronization reference (e.g., when the LTE-V2X service does not support downlink synchronization with an NR-RAN). In contrast, in some other implementations, a gNB may be configured as an allowed synchronization reference to support the LTE-V2X services.

In some of the present implementations, a UE may synchronize with a gNB on an NR Uu interface. That is, in some of the present implementations, for an NR-V2X service, a gNB may be configured as the allowed synchronization reference. It should be noted that the LTE-V2X service/NR-V2X service may be supported in more than one sidelink frequency carrier and therefore different allowed synchronization references may be used in different sidelink frequency carriers.

In a conventional LTE-V2X configuration, one Physical-Cellidentity list may be provided to indicate the applicable area of (part of) a given LTE-V2X configuration. In some of the present implementations, in a multi-RAT sidelink configuration, the applicable area configuration may be configured based on different criteria. For example, the applicable area, in some aspects of the present implementations, may be configured based on a physical cell identity list (which may include an EUTRAN-PhysicalCellidentity list or an NR-RAN-PhysicalCellidentity list), a RAN Notification Area Code (RANAC), a Tracking area code (TAC), or any combination of these three factors (i.e., a combination of physical cell identity, RANAC, and TAC). In some of the present implementations, one NR cell may broadcast physical cell identity, RANAC, or TAC in the cell's system information (SI). Additionally, in some aspects of the present implementations, the cell identities, physical cell identities, RANAC(s), and TAC(s) of one or more (different) Public Land Mobile Networks (PLMNs) may be included in the applicable area of a given multi-RAT sidelink configuration.

In some of the present implementations, the impact of different NR RRC states on a multi-RAT SL configuration may be different based on each different state. In some of the present implementations, (part of) the multi-RAT SL configuration may be applicable only in an NR-RRC Connected state. In some of the present implementations, (part of) the multi-RAT SL configuration may be applicable only in an NR-RRC Inactive state. In some of the present implementations, (part of) the multi-RAT SL configuration may be applicable to an NR-RRC Inactive state, as well as an RRC Connected state. In some of the present implementations, (part of) the multi-RAT SL configuration may be applicable to an NR-RRC Idle state. In some of the present implementations, (part of) the multi-RAT SL configuration may be applicable to any NR-RRC state (the multi-RAT SL configuration may not be impacted by a UE's NR-RRC state).

In some of the present implementations, the UE may release the inapplicable part of multi-RAT SL configuration automatically (e.g., after an RRC state transition). For example, part of the multi-RAT SL configuration may be applicable only while the UE is staying in an RRC Connected state. Then, the UE may store the applicable multi-RAT SL configuration for the RRC Connected state only while the UE is staying in the RRC Connected state and the UE may release the multi-RAT SL configuration applicable to the NR-RRC Connected state after the UE moves to an RRC Idle state, or an RRC Inactive state. In contrast, in some other aspects of the present implementations, the UE may still store the multi-RAT SL configuration applicable to the RRC Connected state even after the UE moves to other RRC states. As such, the UE may be able to reuse the stored multi-RAT SL configuration (e.g., applicable to the RRC Connected state) after the UE moves back to the RRC Connected state again.

The following Table 1 illustrates a brief comparison between an LTE-V2X configuration and a multi-RAT SL configuration.

TABLE 1

| Issue | LTE-V2X configuration | multi-RAT SL configuration |
| --- | --- | --- |
| Allowed Synchronization Reference | GNSS, eNB, UE | a. In some of the present implementations (e.g., NR Standalone scenario), only a GNSS or LTE-UE may be configured as the allowed synchronization reference. Therefore, no PSCell may be indicated in this configuration.<br>b. In some other aspects of the present implementations, an LTE cell may be configured as a PSCell (or a reference cell for LTE-V2X sidelink communication transmission) to coordinate an LTE-V2X service.<br>c. In some implementations, a gNB may not be configured as an allowed synchronization reference (e.g., the LTE-V2X service may not support downlink sync with an NR-RAN). In some other implementations, a gNB may be configured as an allowed synchronization reference. In addition, the gNB may be able to provide dynamic sidelink grant or Type 1/Type 2 sidelink configured grant to the UE. |
| Applicable area configuration | Physical Cell identity list | Any combination of {cell identity list, Physical Cell identity list, RANAC list, TAC list}, cross registered PLMN/equivalent PLMNs/selected PLMN of the UE. |
| NR-RRC states | The LTE-V2X configuration (received through dedicated control signaling) may be applicable only while the UE stays in an LTE-RRC Connected state. | a. In some of the present implementations, (part of) the multi-RAT SL configuration may be applicable only in NR-RRC Connected state.<br>b. In some of the present implementations, (part of) the multi-RAT SL configuration may be applicable only in NR-RRC inactive state.<br>c. In some of the present implementations, (part of) the multi-RAT SL configuration may be applicable to NR-RRC inactive state & RRC Connected state.<br>d. In some of the present implementations, (part of) the multi-RAT SL configuration may be applicable to NR-RRC idle state.<br>e. In some of the present implementations, (part of) the multi-RAT SL configuration may be applicable without being impacted by the UE's NR RRC state. |

Figure 3:
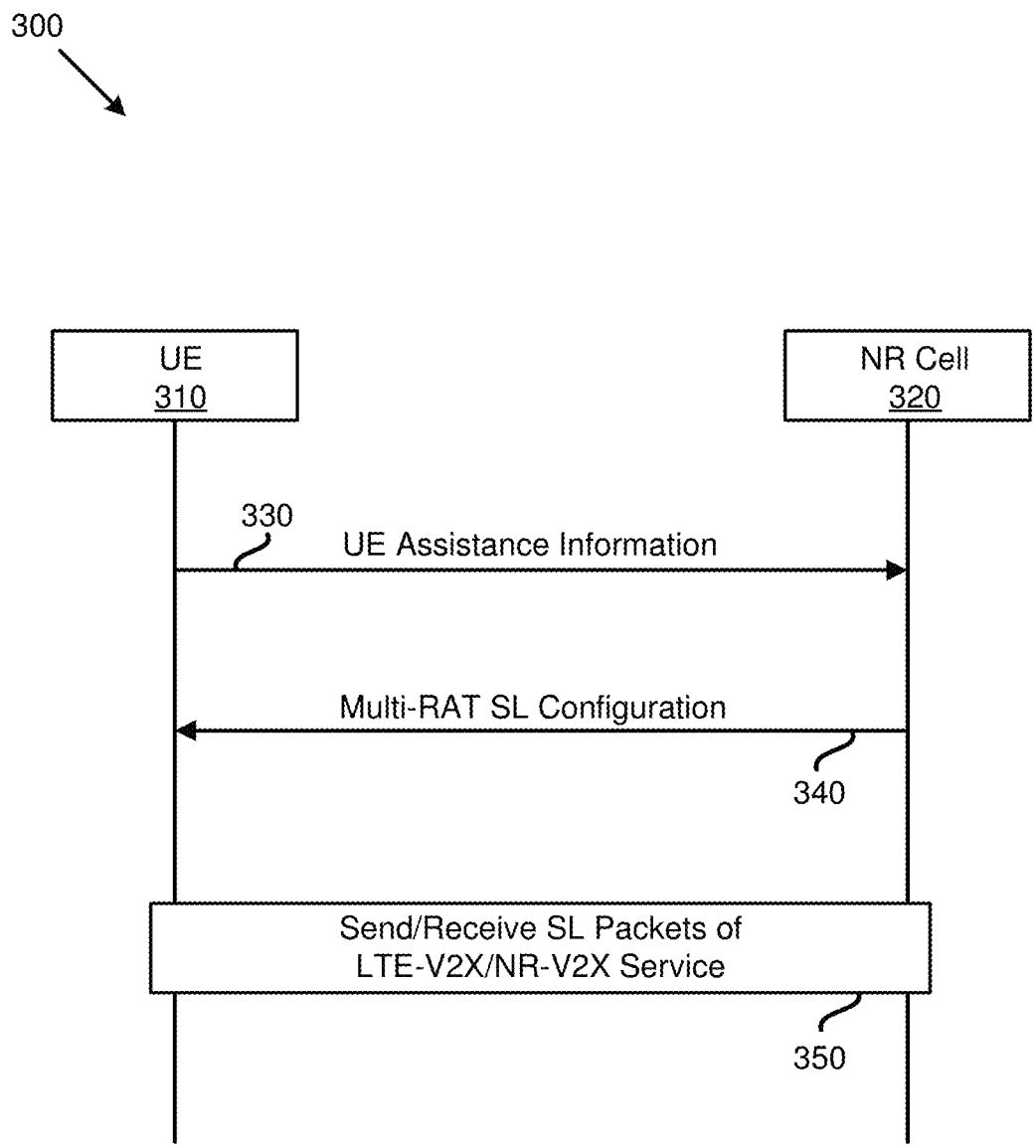
FIG. 3 is a signaling flow diagram illustrating an NR cell transmitting multi-RAT SL configuring data to a UE to configure the UE for an LTE sidelink communication (e.g., with other UEs), according to one example implementation of the present application.

FIG. 3 is a signaling flow diagram 300 illustrating an NR cell transmitting multi-RAT SL configuring data to a UE to configure the UE for an LTE sidelink communication (e.g., with other UEs), according to one example implementation of the present application. As shown, FIG. 3 includes a UE 310 and an NR cell 320. In action 330, the UE 310 may transmit UE assistance information (UEAssistanceInformation) to the NR cell 320. The UE assistance information, in some of the present implementations, may include data indicating the UE's preferences and may request for an LTE-V2X service (e.g., via a dedicated UL control signaling).

In action 340, the NR cell 320 may transmit the multi-RAT SL configuration to the UE 310. In some of the present implementations, the multi-RAT SL configuration may be transmitted to the UE 310 through dedicated RRC signaling (e.g., an RRCConnectionReconfiguration message) in the Signaling Radio Bearer 1 (SRB1) or SRB2 of the serving NR cell 320. The NR cell 320 may be a PCell in a network that does not involve dual connectivity (and/or carrier aggregation) in NR Uu interface. That is, it is possible that no PSCell (nor a secondary node, such as an eNB) is indicated in the multi-RAT SL configuration (in which case the UE 310 may apply multi-RAT SL configuration by applying the GNSS as the sidelink synchronization reference). In some other aspects of the present implementations, an LTE cell may be indicated (e.g., in the configuration) as the PSCell (or a reference cell for LTE-V2X sidelink communication transmission) to support an LTE-V2X service for the UE. In some of such implementations, the UE may synchronize with the indicated LTE cell to exchange data associated with the LTE-V2X service based on the instructions received from the LTE cell (i.e., the PSCell). Action 350 illustrates that after the UE 310 receives the multi-RAT SL configuration from the NR cell 320 (e.g., through an NR interface), the UE may start transmitting (and receiving) sidelink packets to (and from) one or more other UEs (not shown in the figure) on the (requested) V2X service(s) (e.g., through an LTE Uu interface or NR Uu interface) based on the received SL configuration.

In some of the present implementations, the diagram 300 may be implemented during a handover procedure. For example, the NR cell 320 may be a source cell to the UE 310 during a handover procedure. As such, in action 340, the NR cell 320 may transmit the Multi-RAT SL configuration to the UE 310 when the NR cell 320 indicates to the UE 410 to initiate a handover procedure by sending dedicated control signaling (e.g., RRC signaling with the information element 'reconfigurationWithSync') to the UE 310. In some of such implementations, the multi-RAT SL configuration may also be transmitted with the dedicated control signaling (e.g., the multi-RAT SL configuration may be included in the 'reconfigurationWithSync' IE). After receiving the dedicated control signaling in action 340, the UE 310 may send/receive SL packets of the LTE-V2X/NR-V2X service based on the received multi-RAT SL configuration, which may include an NR-V2X SL configuration and/or an LTE-V2X SL configuration. In some of the present implementations, (part of) the received multi-RAT SL configuration may be valid only during the handover procedure. Therefore, the UE may release the invalid part of multi-RAT SL configuration automatically after the UE handovers to the target cell (not shown in the diagram 300) successfully (e.g., after the UE sends the RRCConnectionReconfigurationComplete message to the target cell).

In addition, (part) of the received multi-RAT SL configuration may still be valid after the handover procedure. Therefore, the UE may store the (valid) multi-RAT SL configuration and keep accessing the given SL radio resources configured in the multi-RAT SL configuration after the UE handovers to the target cell successfully. It should be noted that in some other implementations, the source cell may also be an LTE cell.

Figure 4:
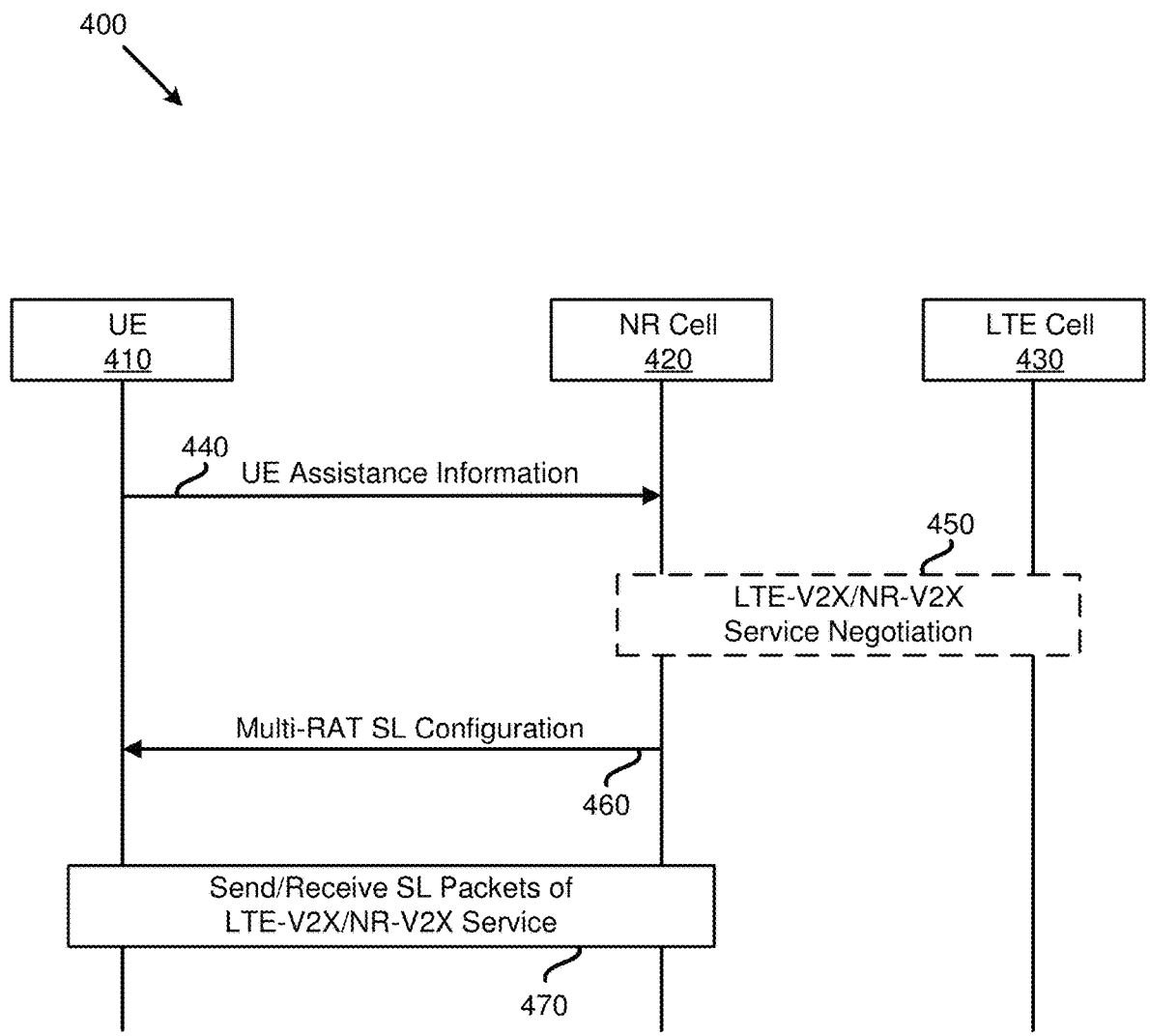
FIG. 4 is a diagram illustrating an NR cell negotiating with an LTE cell for transmitting multi-RAT SL configuring data to a UE by the NR cell, according to one example implementation of the present application.

FIG. 4 is a diagram 400 illustrating an NR cell negotiating with an LTE cell for transmitting multi-RAT SL configuring data to a UE by the NR cell, according to one example implementation of the present application. As shown, FIG. 4 includes a UE 410, an NR cell 420 (e.g., associated with a gNB base station), and an LTE cell 430 (e.g., associated with an eNB base station). In action 440, the UE 410 may transmit UE assistance information to the NR cell 420. The UE assistance information, as described above, may include data indicating the UE's preferences and may request for an LTE-V2X service and/or NR-V2X service (e.g., via a dedicated UL control signaling). In action 450, the NR cell 420 may negotiate with the LTE cell 430 (e.g., through a backhaul connection) for the multi-RAT SL configuration.

In action 460, the NR cell 420 may transmit the multi-RAT SL configuration to the UE 410. In some of the present implementations, the multi-RAT SL configuration may be transmitted to the UE 410 through dedicated RRC signaling (e.g., an RRCConnectionReconfiguration message) in the SRB1 or SRB2 of the serving NR cell 420. In action 470, after the UE 410 receives the multi-RAT SL configuration from the NR cell 420 (e.g., through an NR Uu interface), the UE may start transmitting (and receiving) sidelink packets to (and from) one or more other UEs on the (requested) V2X service(s) (e.g., through an LTE Uu interface) based on the received configuration.

In some of the present implementations, the diagram 400 may be implemented during an inter-RAT handover procedure. For example, the NR cell 420 may be the source cell for the UE 410 during the handover procedure. Then, the LTE cell 430 may be the target cell to the UE 410. In action 460, the NR cell 420 may negotiate with the LTE cell 430 for the handover preparation. Then, the sidelink configuration, during the handover procedure, may also be configured by the LTE cell 430 during the handover preparation. In action 450, the NR cell 420 may indicate to the UE 410 to initiate a handover procedure by sending dedicated control signaling (e.g., RRC signaling with the information element 'reconfigurationWithSync', which may include Layer 2/Layer 1 configurations for the UE 410 to implement during the handover procedure) to the UE 410. In some of the present implementations, the multi-RAT SL configuration may also be transmitted with the dedicated control signaling (e.g., the multi-RAT SL configuration may be included in the 'reconfigurationWithSync' IE). After receiving the dedicated control signaling in action 450, the UE 410 may send/receive SL packets of the LTE-V2X/NR-V2X service based on the received multi-RAT SL configuration.

In some of the present implementations, (part of) the received multi-RAT SL configuration may be valid only during the handover procedure. As such, the UE may release the invalid part of the multi-RAT SL configuration automatically after the UE handovers to the target cell (e.g., the LTE cell 430) successfully (e.g., after the UE sends an RRCConnectionReconfigurationComplete message to the target cell). In contrast, (part) of the received multi-RAT SL configuration may still be valid after the handover procedure. Therefore, the UE may store the (valid) multi-RAT SL configuration and keep accessing the given SL radio resources configured in the multi-RAT SL configuration after the UE handovers to the target cell successfully. It should be noted that in some other aspects of the present implementations, the source cell may be an LTE cell and the target cell may be an NR cell.

Figure 5:
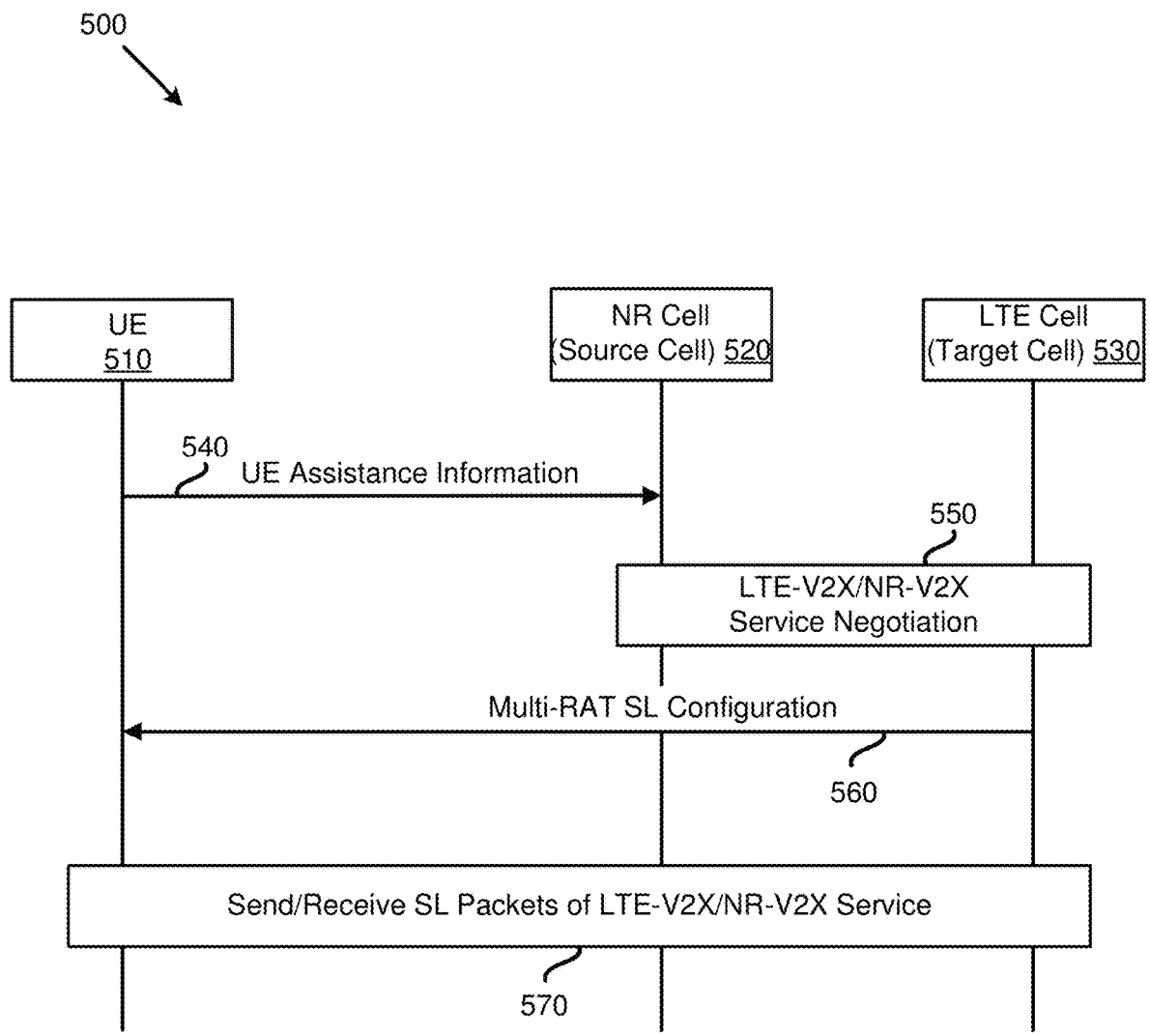
FIG. 5 is a diagram illustrating a secondary LTE cell (or a target LTE cell, in some implementations) transmitting multi-RAT SL configuring data to a UE to configure the UE for an LTE sidelink communication, according to one example implementation of the present application.

FIG. 5 is a diagram 500 illustrating a secondary LTE cell transmitting multi-RAT SL configuring data to a UE to configure the UE for an LTE sidelink communication, according to one example implementation of the present application. As shown, FIG. 5 includes a UE 510, an NR cell 520 (e.g., associated with a master gNB base station), and an LTE cell 530 (e.g., associated with a secondary eNB base station). In action 540, the UE 510 may transmit UE assistance information to the NR cell 520. The UE assistance information, as described above, may include data indicating the UE's preferences and may request for an LTE-V2X service and/or NR-V2X service (e.g., via a dedicated UL control signaling). In action 550, the NR cell 520 may negotiate with the LTE cell 530 (e.g., through a backhaul connection) for the multi-RAT SL configuration after receiving the UE assistance information from the UE 510.

In action 560, the LTE cell 530 may transmit the multi-RAT SL configuration to the UE 510 after the negotiation with the NR cell 520. In some of the present implementations, the LTE cell 530 (e.g., a PSCell) may configure the sidelink resource configuration (e.g., via RRC signaling) through an SRB3 established directly between the LTE cell 530 and the UE 510. Alternatively, the LTE cell 530 may indicate one or more dynamic sidelink radio resources to the UE 510 by transmitting LTE Downlink Control Information (DCI) (e.g., based on an LTE protocol) directly to the UE 510. In action 570, after the UE 510 receives the multi-RAT SL configuration from the LTE cell 530 (e.g., through an LTE Uu interface), the UE may start transmitting (and receiving) sidelink packets to (and from) one or more other UEs on the (requested) V2X service(s) (e.g., through an LTE Uu interface) based on the received configuration.

In some of the present implementations, the NR cell 520 and the LTE cell 530 may operate on different frequency carriers. For example, the NR cell 520 may be operating on a frequency band #1, where the frequency band #1 may be provided to support an enhanced mobile wideband service, while the LTE cell 530 may be operating on a frequency band #2, where the frequency band #2 may be dedicated to support an LTE-V2X service.

It should be noted that in some aspects of the present implementations, the RAN (e.g., the NR cell 520) may deliver the multi-RAT SL configuration directly to the UE without receiving any UE assistance information (or preference) from the UE (e.g., UEAssistanceInformation about a V2X service), or without receiving UE's measurement result (e.g., about the LTE cell). In some of such implementations, the serving cell may configure the UE with multi-RAT SL configuration in the first RRCConnectionReconfiguration message sent to the UE (e.g., during an initial access procedure performed by the UE). For a UE in an RRC Inactive state, in some of the present implementations, the multi-RAT SL configuration may be delivered by an RRC Connection Resume message or an RRC Connection Release message. Conversely, for a UE in an RRC Connected state, the multi-RAT SL configuration may be provided through an RRC message with the information element (IE) 'reconfigurationWithSync'), which may be delivered during a (inter-RAT/intra-RAT) handover procedure.

In some of the present implementations, the multi-RAT SL configuration may be provided to the UE through an LTE-V2X addition message when the UE receives the sidelink configuration without any stored configuration at the UE side. In some of the present implementations, if the UE has previously stored multi-RAT SL configuration at the UE (e.g., stored in one or more memories of the UE), the serving cell may apply a delta signaling approach to only update the multi-RAT SL configuration stored at the UE by providing sidelink modification configuration, for example, in another RRC signaling. In some other aspects of the present implementations, the serving cell may send a request to the UE to release all of its stored LTE-V2X-related configurations (e.g., by sending an LTE-V2X Release message in a dedicated signaling, such as an RRC message). It should be noted that the described implementations for message addition, delta signaling, and message release may be equally applicable to an NR-V2X SL configuration (e.g., an NR-V2X addition message and an NR-V2X Release message may be transmitted to the UE to configure an NR-V2X SL configuration and to release the stored NR-V2X SL configuration in the UE side respectively).

Figure 6:
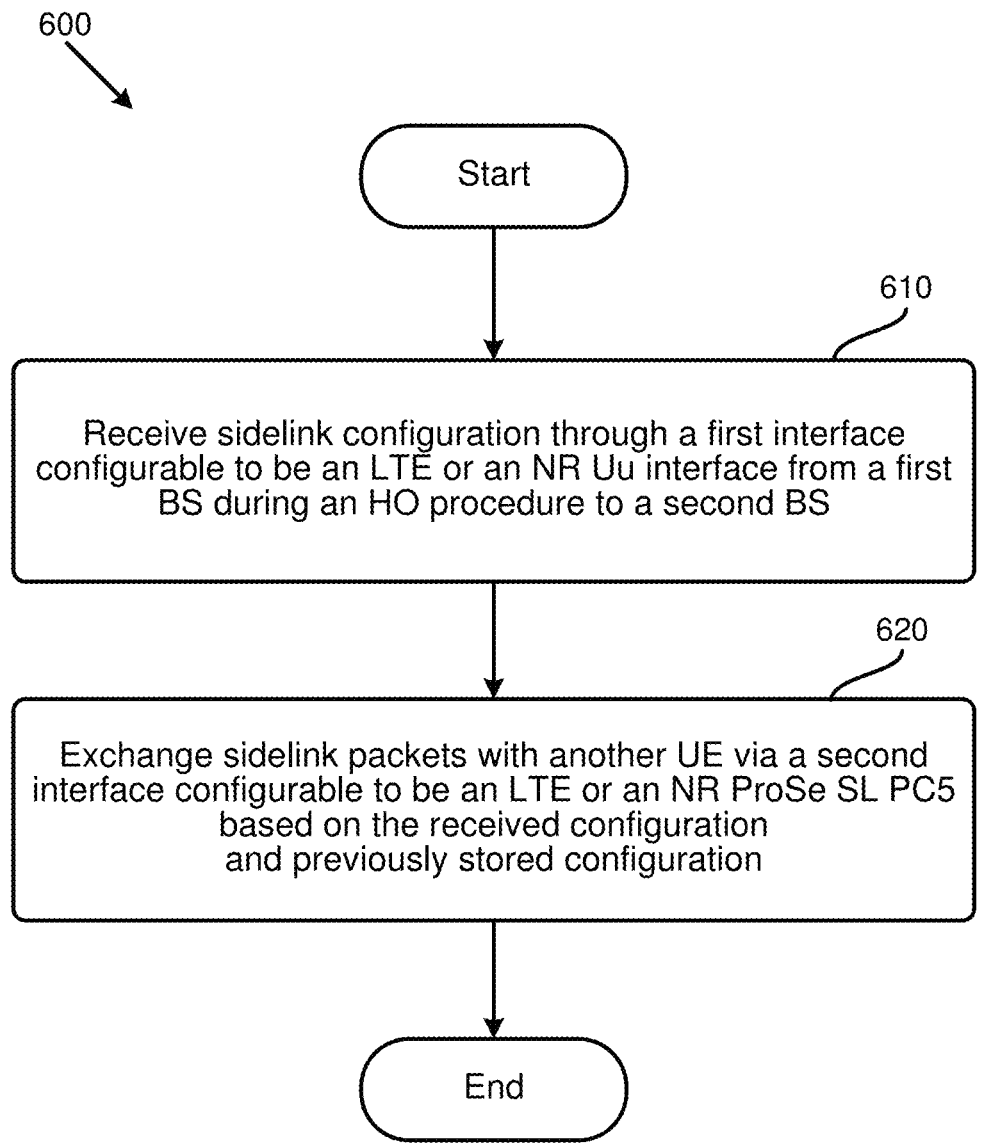
FIG. 6 is a flowchart illustrating a method (or process) performed by a UE for communicating sidelink packets with another UE through either an LTE PC5 interface or an NR PC5 interface, according to an example implementation of the present application.

FIG. 6 is a flowchart illustrating a method (or process) 600 performed by a UE for communicating sidelink packets with another UE through either an LTE PC5 interface or an NR PC5 interface, according to an example implementation of the present application. The process 600 may start, in action 610, by the UE receiving sidelink configuration from a base station (or a cell associated with the base station). The UE may receive the sidelink configuration from the base station through a Uu interface. The Uu interface may be configured as an NR Uu interface in some of the present implementations. For example, the Uu interface may be configured between an NR base station (e.g., a gNB) and the UE. In some of the present implementations, the Uu interface may be configured as an LTE Uu interface. For example, the Uu interface may be configured between an LTE base station (e.g., an eNB) and the UE. The UE may receive the sidelink configuration via RRC signaling of NR Uu interface or LTE Uu interface. In some of the present implementations, the UE may receive the sidelink configuration from a first base station, while the UE is performing a handover procedure to transition to a second base station.

After receiving the sidelink configuration, the process 600 may start exchanging, in action 620, one or more sidelink packets with another UE based on the received configuration. In some of the present implementations, the process may exchange the sidelink packets through an interface different from the interface through which the configuration is received (from the base station). In some of the present implementations, the second interface may be a PC5 interface (e.g., a ProSe PC5 interface). In some of the present implementations, the received sidelink configuration may include configuration data for configuring the PC5 interface as an LTE PC5 interface, or as an NR PC5 interface. In some aspects of the present implementations, the process may also use previously stored (e.g., at a memory module of the UE) configuration data in addition to the received configuration data to configure the PC5 interface. The process 600 may then end.

As an example, the process 600 may receive multi-RAT SL configuration data through an NR Uu interface between the UE and a gNB base station. The process may then configure an LTE PC5 interface for the UE based on the received configuration. After configuring the LTE PC5 interface, the process may use this interface to transmit/receive one or more sidelink packets to/from another UE. Conversely, the process 600 may receive multi-RAT SL configuration data through an NR Uu interface between the UE and a gNB base station. The process may then configure an NR PC5 interface for the UE based on the received configuration. After configuring the NR PC5 interface, the process may use this interface to transmit/receive one or more sidelink packets to/from another UE. As yet another example, the process 600 may receive multi-RAT SL configuration data through an LTE Uu interface between the UE and an eNB base station. The process may then configure an NR/LTE PC5 interface for the UE based on the received configuration. After configuring the NR/LTE PC5 interface, the process may use this interface to transmit/receive one or more sidelink packets to/from another UE.

Figure 7:
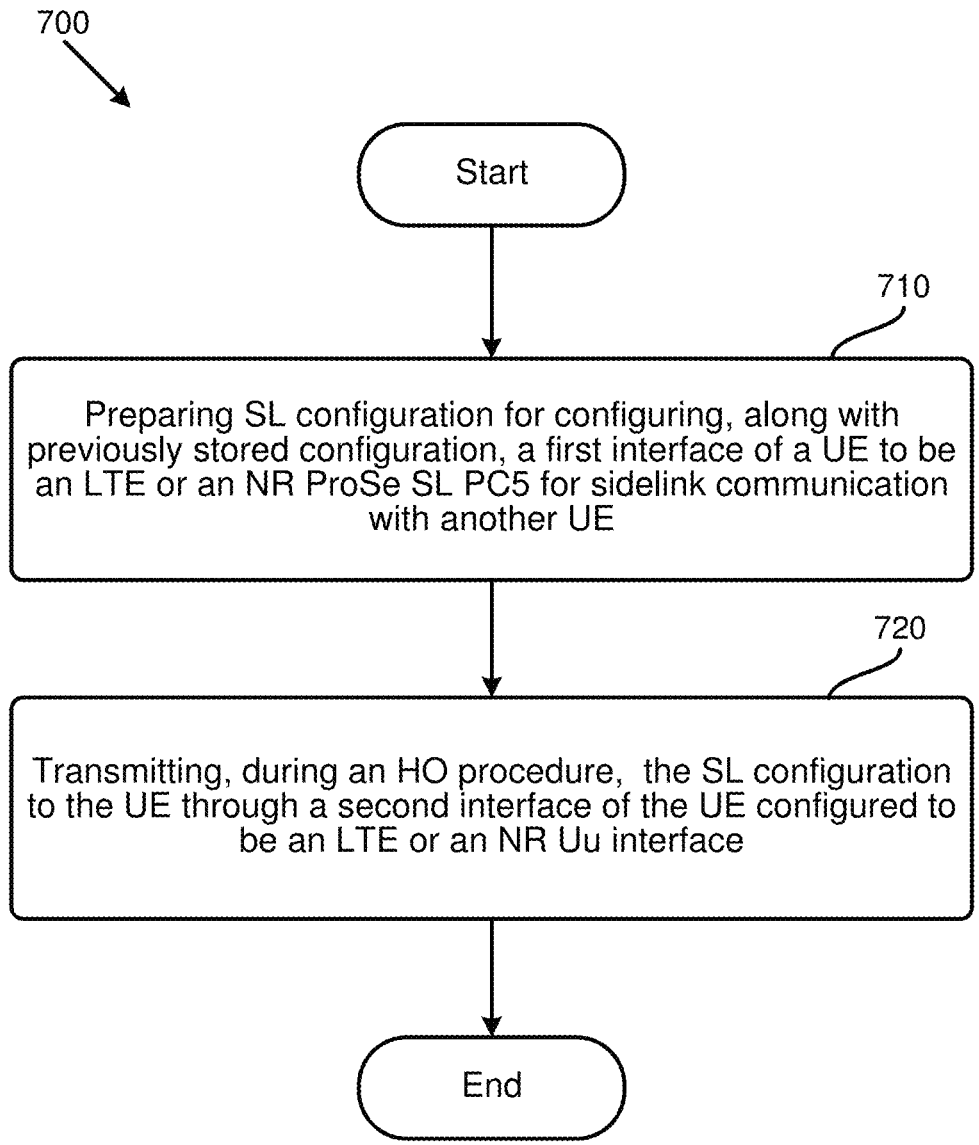
FIG. 7 is a flowchart illustrating a method (or process) performed by a base station for configuring a UE to communicate sidelink packets with another UE through either an LTE PC5 interface or an NR PC5 interface, according to an example implementation of the present application.

FIG. 7 is a flowchart illustrating a method (or process) 700 performed by a base station for configuring a UE to communicate sidelink packets with another UE through either an LTE PC5 interface or an NR PC5 interface, according to an example implementation of the present application. The process 700 may start, in action 710, by the base station preparing multi-RAT SL configuration for configuring a UE to exchange one or more sidelink packets with another UE. In some of the present implementations, the configuration data may be for configuring an interface of the UE to exchange sidelink packets with another UE. In some of the present implementations, the interface of the UE may be a PC5 interface (e.g., a ProSe PC5 interface). In some of the present implementations, the sidelink configuration may include configuration data for configuring the PC5 interface as an LTE PC5 interface, or as an NR PC5 interface. In some aspects of the present implementations, the UE may also use previously stored (e.g., at a memory module of the UE) configuration data, in addition to the multi-RAT SL configuration data, to configure the PC5 interface.

After preparing the multi-RAT SL configuration data, the process 700 may send, in action 720, the prepared multi-RAT SL configuration to the UE. The process may send the sidelink configuration through an interface different from the interface through which the UE exchanges sidelink packets with other UEs. In some of the present implementations, the second interface may be a Uu interface. The Uu interface may be configured as an NR Uu in some of the present implementations. For example, the Uu interface may be configured between an NR base station (e.g., a gNB) and the UE. In some of the present implementations, the Uu interface may be configured as an LTE Uu interface. For example, the Uu interface may be configured between an LTE base station (e.g., an eNB) and the UE. The base station may transmit the sidelink configuration to the UE via RRC signaling on either LTE Uu interface or NR Uu interface. In some of the present implementations, the base station may send the sidelink configuration to the UE, while the UE is performing a handover procedure to transition to another base station. The process 700 may then end.

Two different types of a multi-RAT SL configuration may include an LTE-V2X SL configuration and an NR-V2X SL configuration in some of the present implementations. The LTE-V2X SL configuration, in some of the present implementations, may include, but is not limited to, ProSe Group configuration, frequency carrier(s), synchronization configuration, resource configuration, validity area configuration, etc. Each of the aforementioned configurations is described in detail in the following paragraphs. Table 2 below illustrates a brief description for each of these configurations and the following paragraphs describe more detail for each of the configurations in an LTE-V2X SL configuration.

TABLE 2

| LTE-V2X SL configuration | |
| --- | --- |
| ProSe group configuration | Source ID: Source ID of the UE itself. ProSe group identity: <br> 1) Indicates the source ProSe UE ID. <br> 2) Indicates the destination ID(s) (could be the combination of ProSe group ID, ProSe Layer-2 Group ID, or ProSe UE ID) which the UE may communicate with other UE(s) through sidelink based on the received LTE-V2X SL configuration. |
| LTE-V2X-frequency carrier(s) | Indicates (at least) one frequency carrier (wherein each frequency carrier may be represented by ARFCN (absolute Radio-Frequency Channel Number) or NR-ARFCN) that the UE is allowed to access for LTE V2X service. |
| LTE-V2X synchronization configuration | Indicates sidelink synchronization configuration for the LTE-V2X service. |
| LTE-V2X resource configuration | Indicates Tx/Rx sidelink physical resource configuration for LTE-V2X service. |
| LTE-V2X validity area configuration | Indicates the applicable area(s) for the configured LTE-V2X SL configuration |

In some of the present implementations, a UE may exchange data with more than one ProSe group. In some of such implementations, each ProSe group may be configured with a unique ProSe group identity. A ProSe group configuration may be provided for a one-to-one communication or a one-to-many communication. The ProSe group identity may be configured by a higher layer directly (e.g., the LTE-V2X application layer) or may be derived from a group identity configured by a higher layer (e.g., a ProSe Layer-2 Group ID may be derived for rendering the ProSe group identity). In some of the present implementations, for a one-to-one sidelink communication, the ProSe group identity may be replaced by a ProSe UE ID.

Additionally, in some of the present implementations, a UE may also be configured with a specific UE identity (e.g., ProSe UE ID) as the source UE ID to exchange data with other sidelink UEs. Therefore, in a ProSe Group configuration, one ProSe UE ID for the source UE itself and at least one ProSe group identity (or ProSe Layer-2 Group ID) may be configured to the UE. In some of the present implementation, one source UE ID (e.g., for the source of a sidelink control information, or a sidelink Packet Data Unit (PDU), or a MAC Control Element (CE)) and one destination ID (e.g., for the destination of the sidelink control information, or the sidelink PDU, or the MAC CE) may be included in the Sidelink Control Information (SCI), MAC subheader, or MAC CE of one sidelink packet. Therefore, one receiver UE may filter out the sidelink packets for which the UE has no interest by verifying the source UE ID and the destination ID in the SCI or sidelink packet.

In some of the present implementations, a frequency carrier may indicate at least one component carrier that the UE is allowed to access the LTE V2X service. In some of the present implementations, the RAN may decide the frequency carrier(s) based on a UE's capability in the supported Transmitter/Receiver (Tx/Rx) V2X bands on different capable Multi-Rat Dual Connectivity (MR-DC) band combinations (e.g., UE feature sets). Therefore, the UE may need to report its capable V2X bands on different MR-DC band combinations in a dual connectivity scenario in some of the present implementations. In addition, the UE may apply carrier aggregation for the LTE-V2X service based on the given LTE-V2X-frequency carriers. For a synchronization configuration in a multi-RAT SL configuration, a UE may need to select a synchronization reference to access the LTE-V2X service based on a given LTE-V2X SL synchronization configuration, which may define a set of one or more possible synchronization references for the UE. A multi-RAT SL synchronization configuration, in some of the present implementations, may include, but is not limited to, an allowed synchronization reference, an Offset Direct Frame Number (OffsetDFN) value, a synchronization reference (SyncRef) UE configuration, etc.

In some of the present implementations, a UE may be allowed to access an LTE-V2X service by identifying {eNB, GNSS, LTE-UE} as the synchronization reference. To support the LTE-V2X service, the UE may need to determine the synchronization reference to obtain the (DL/UL) timing for sidelink packet transmission/reception among the frequency carrier(s). However, in implementation, a gNB may not be configured as one of the synchronization references if the LTE-V2X service is not enhanced to support sidelink operations by referring to NR-RAN downlink timing. In some additional implementations, a gNB may be configured as one of the synchronization references for the UE to implement sidelink packet transmission/reception for an LTE-V2X service. Moreover, an eNB may not be configured as one of the synchronization references (in one frequency carrier) either if no LTE-RAN is deployed in the corresponding frequency carrier. In some of the present implementations, different LTE-V2X-frequency carriers may be configured with different synchronization references (e.g., as shown in Table 3 below). In Table 3, an eNB may be included as the allowed synchronization reference in CC #1 and therefore, the UE may select an LTE cell on the corresponding frequency carrier as the sidelink synchronization reference. Otherwise, the UE may select, for example, the GNSS as the synchronization reference (e.g., in CC #2 and CC #3 in Table 3).

TABLE 3

| LTE-V2X-freq. carrier | Allowed synch. reference | LTE-V2X-SyncConfig ID |
|---|---|---|
| CC#1 (FR1) | eNB | LTE-V2X-SyncConfig#1 |
| CC#2 (FR1) | GNSS | LTE-V2X-SyncConfig#2 |
| CC#3 (FR1) | GNSS | LTE-V2X-SyncConfig#3 |

As shown in the above Table 3, each frequency carrier may be provided with one corresponding LTE-V2X-SyncConfiguration in some of the present implementations. Based on the timing of a selected synchronization reference, further configurations (e.g., an Offset DFN value, a SyncRef UE configuration, etc.) may be provided in each frequency carrier. An OffsetDFN value, in some of the present implementations, may indicate a timing offset for a UE to determine a Direct Frame Number (DFN) timing when the UE selects the GNSS as the synchronization source. A UE, in some of the present implementations, may become a synchronization source based on the SyncRef UE configuration. In some of the present implementations, the SyncRef UE configuration may further include, but is not limited to, an SLSSID, a syncTxThreshold, Syncoffsetindicator, one or more radiation power configurations, etc.

In some of the present implementations, a UE should broadcast the corresponding SLSS periodically based on the given SLSSID after the UE becomes a SyncRef UE. The syncTxThreshold may be configured to the UE with a specific value (e.g., syncTxThreshold=x_eNB dB) to indicate the UE may become a syncRef UE if the UE selects an eNB as a synchronization reference and the Reference Signal Receiving Power (RSRP) value of the corresponding eNB (e.g., by measuring the downlink reference signaling broadcasted by the corresponding eNB) is lower than the x_eNB dB. Also in some of the present implementations, different values (e.g., syncTxThresholdIC and syncTxThresholdOoC) may be configured to a UE to refer to the UE while the UE is under the coverage of an LTE RAN (e.g., to apply syncTxThresholdIC) or not (e.g., to apply syncTxThresholdOoC) and while the eNB is configured as the synchronization reference in one corresponding frequency. In some of the present implementations, the Syncoffsetindicator may also be provided in the configuration in order to indicate the subframe to which the UE should deliver the sidelink MIB (SL-MIB) after the UE becomes a SyncRef UE. (e.g., by referring to the formula: 10*DFN+subframe number) mod 40=syncOffsetIndicator).

In some of the present implementations, the radiation power configuration(s) (e.g., TxPowerParameters-LTE) may be provided to a UE in the sidelink configuration. The UE may apply the TxPowerParameters-LTE while the UE is delivering the sidelink packets on the PC5 interface (e.g., an LTE PC5 interface). Each TxPowerParameters-LTE parameter set may include the P0 and alpha values in different sidelink physical channels, which may include the {PSSS, PSSCH, PSCCH, PSDCH}. Table 4 below illustrates the transmitting (Tx) power parameters for a UE to transmit sidelink packets for the LTE-V2X service.

TABLE 4

| Sidelink power config. | Tx power parameters |
|---|---|
| TxPowerParameters-LTE | $P0_{lte\text{-}omni}$, $alpha_{PSSS\text{-}lte}$, $alpha_{PSSS\text{-}lte}$, $alpha_{PSSCH\text{-}lte}$, $alpha_{PSCCH\text{-}lte}$, $alpha_{PSDCH\text{-}lte}$, |

For the alpha value configuration: al0 corresponds to 0, al04 corresponds to value 0.4, al05 to 0.5, al06 to 0.6, al07 to 0.7, al08 to 0.8, al09 to 0.9 and al1 correspond to 1. This field applies for sidelink power control.
PSSS: physical sidelink synchronization signal.
PSSCH: physical sidelink shared channel.
PSDCH: physical sidelink discovery channel.
PSCCH: physical sidelink control channel.

In some of the present implementations, a UE may be able to obtain the sidelink physical resource(s) (e.g., included in the LTE-V2X resource configuration) to transmit/receive LTE-V2X service via different mechanisms. These different mechanisms may include, but are not limited to, the sidelink physical resources provide by an eNB, by an eNB scheduling, by a gNB scheduling, or through exceptional pools. In some of the present implementations, an eNB may provide the Tx/Rx Resource Pool configurations, each of which may include a location of the sidelink resource pool, the allowed synchronization reference, and the zone-base resource pool configuration.

Figure 8:
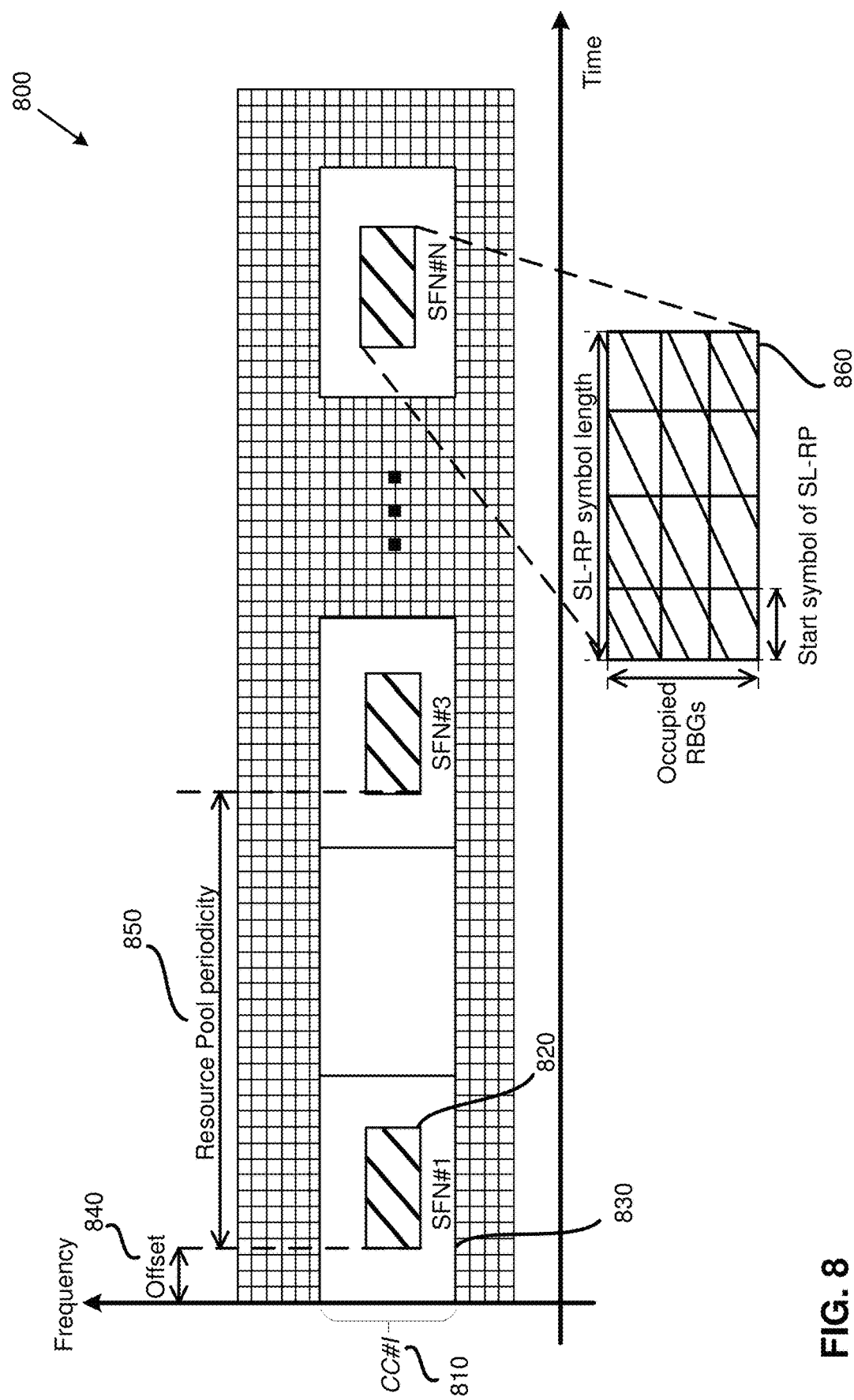
FIG. 8 is a time-frequency resource grid illustrating a sidelink resource pool resource allocation configuration transmitted in a component carrier, according to an example implementation of the present application.

FIG. 8 is a time-frequency resource grid 800 illustrating a sidelink resource pool resource allocation configuration transmitted in a component carrier, according to an example implementation of the present application. As shown in FIG. 8, a base station may provide, in one component carrier 810, a set of (virtual) Resource Blocks (RBs) called sidelink resource pools (SL-RPs) 820. The SL-RPs 820 may appear periodically (e.g., in the time domain) after the UE receives the dedicated RRC signaling. In some of the present implementations, different parameters, such as SL-RP-offset, SL-RP-Period, the start symbol of a Resource Pool, symbol length of Resource Pool, number of occupied Resource Block Groups (RBGs) for each Resource Pool may be configured to indicate the location of each Tx/Rx sidelink resource pool.

In some of the present implementations, the serving cell may configure multiple SL-RP configurations to one UE, and each SL-RP configuration may be configured with an SL-RP_index. The index for a starting system frame number (SFN) 830 of the SL-RPs 820 (e.g., after the UE receives the SL-RP configuration from the serving cell), in some of the present implementations, may be indicated by a particular parameter, such as the SL-RP_Starting_SFN parameter. Another parameter, such as the SL-RP_Period parameter may indicate the periodicity of the SL-RP in the time domain, with the unit of SL-RP_Period being a radio frame, subframe, slot, symbol, or microsecond, millisecond. For example, a SL-RP Period 850 in FIG. 8 may indicate the time interval between the SL-RPs 820. The SL-RP_offset may indicate the offset from the starting point of the SL-RP, for example, with respect to the starting point of the starting SFN 830, in the time domain. In the illustrated example of FIG. 8, a SL-RP Offset 840 may indicate the offset for the SL-RPs 820. In some of the present implementations, the unit of the SL-RP_offset parameter may be radio frame, subframe, slot, symbol, millisecond, or microsecond. FIG. 8 illustrates an example SL-RP 860 showing more details of an example SL-RP (e.g., the number of symbols, symbol length, occupied RBGs, etc.).

In some aspects of the present implementations, after the UE receives the SL-RP configuration (e.g., in the LTE-V2X SL configuration), the UE may exchange SL packets on one or more SL-RPs 820. In some of the present implementations, several different SL-RP configurations may be provided in one bandwidth part (BWP). In some of such implementations, the serving cell may activate (and/or deactivate or release) one or more of the provided SL-RP configurations, for example, through RRC signaling or downlink control information (DCI).

In some of the present implementations, the UE may be allowed to access a Tx Resource Pool only when the UE is synchronized with specific synchronization reference(s) directly or indirectly (e.g., through the relaying of some other UEs). The Allowed synchronization reference to a resource pool may be any combination of {GNSS, eNB, LTE-UE, NR-UE, gNB}.

In some of the present implementations, after a UE receives the LTE-V2X SL configuration, the configured SL resource allocation may need to be updated, especially when the UE moves from one location to another. Moreover, the network may need to control the validity of the configured SL radio resources stored at the UE. Some of the present implementations may provide a zone-based SL resource pools configuration from which the UE may (autonomously) select resources and check the validity of the selected resources. Similar to LTE V2X service, zone-based resource pool configuration may be provided to the UE to determine which radio resource pool to access to transmit sidelink packets based on the UE's geographical location (e.g., through the help of the GNSS) and the configured zone(s) to each resource pool.

Figure 9:
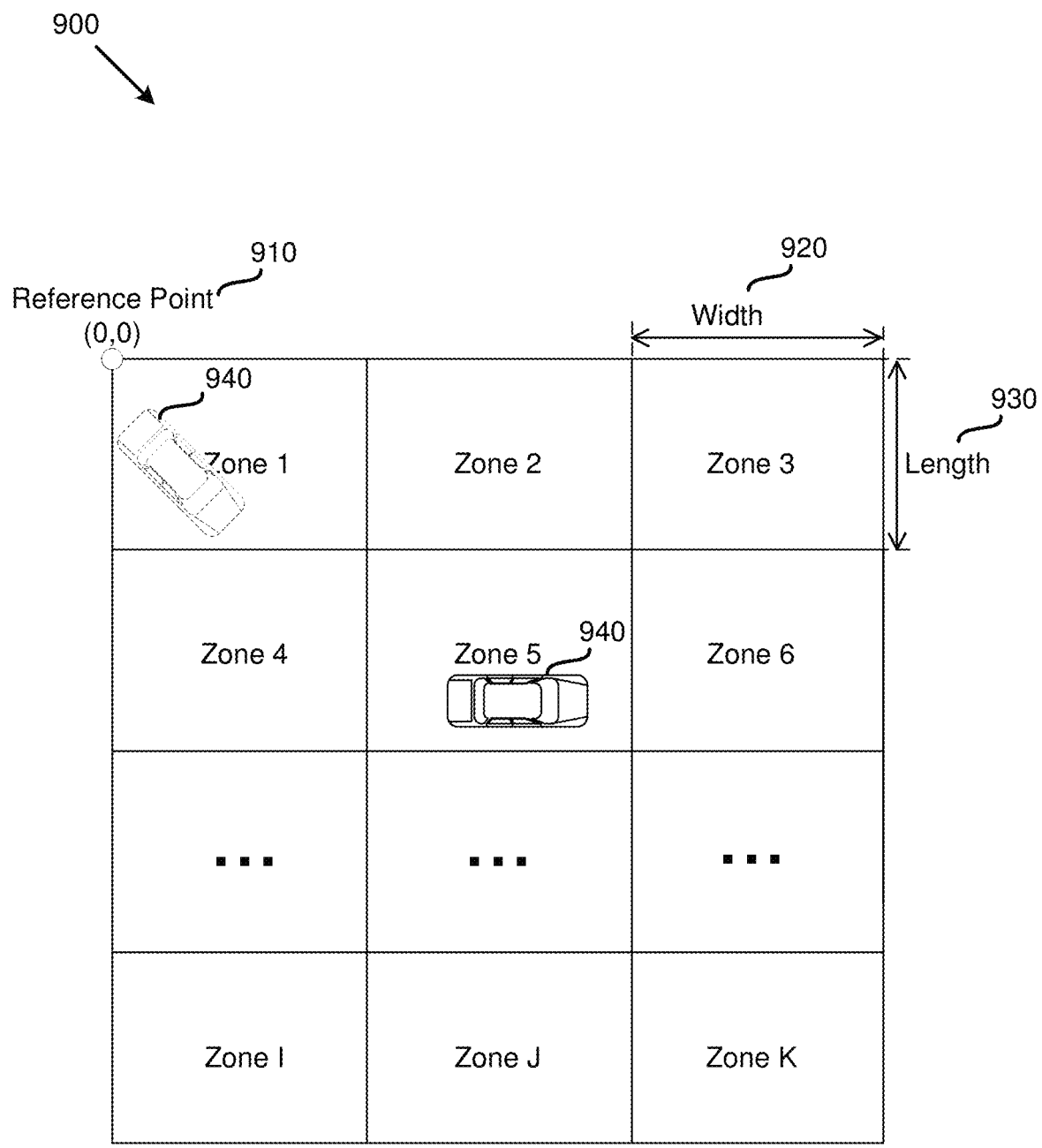
FIG. 9 is a map of a geographical area divided into several different zones, for example, by a base station, according to an example implementation of the present application.

FIG. 9 is a map of a geographical area 900 divided into several different zones, for example, by a base station, according to an example implementation of the present application. As shown in FIG. 9, the geographical area 900 is divided into logical zones Zone 1, Zone 2, . . . , Zone K by the base station (e.g., an eNB, or a gNB). Each zone may be configured with a unique zone identity (ID) in some aspects of the present implementation. A fixed reference point 910 (e.g., having geographical coordinates (0, 0)), a length 920, and a width 930 of one zone may be provided in the zone configuration in some of the present implementations. A UE (e.g., a vehicle 940) may determine the zone identities by means of modulo operation using the length and width of each zone, number of zones in length, number of zones in width, the single fixed reference point and the geographical coordinates of the UE's current location.

In some of the present implementations, an eNB may schedule dynamic sidelink resources (or resource pools) to the UE through, for example, DCI. As such, the UE may transmit sidelink packets of LTE V2X service through the given sidelink resource/resource pool. In a DC scenario, the UE may need to build an RRC connection with the PSCell for accessing the LTE-V2X service. However, it should be noted that the physical connection with the PSCell and so the indicated scheduled resource may be affected by the RRC states of the UE. Therefore, in some implementations, the UE may directly release the configured sidelink resource/resource pool that the UE receives from the PSCell after the UE moves to an RRC Inactive state or an RRC Idle state (e.g., in some implementations, the UE may move to an RRC Inactive state/RRC Idle state based on the instructions, such as an RRC Connection Release message received from the PCell). In some other implementations, the UE may release the configured sidelink resource/resource pool that the UE receives from the PSCell after an MCG radio link failure event occurs, or an SCG radio link failure event occurs.

In some of the present implementations, a gNB may schedule dynamic sidelink resources to the UE through, for example, NR DCI. As such, the UE may transmit the sidelink packets of the LTE V2X service through the given sidelink resource. In a DC scenario, the UE may need to stay in an NR-RRC Connected state with the NR-RAN so the UE may be able to obtain the DCI, which may indicate the dynamic sidelink grant received from the serving gNB.

In some of the present implementations, exceptional pools may be configured for the UE so the UE may access the configured exceptional pools during some preconfigured exceptional cases, such as when a radio link failure problem of the synchronization reference (e.g., gNB or eNB) of the V2X service is detected (and so the timer T310 in LTE/NR protocol is counting), or when an RRC Connection reestablishment procedure is triggered due to a radio link failure problem (and so the timer T301/T311 in LTE/NR protocol is counting). Table 5 below illustrates different mechanisms for obtaining the sidelink physical resource(s) (e.g., included in the LTE-V2X resource configuration).

It should be noted that, in some of the present implementations, a UE may obtain sidelink physical resource(s) through different approaches (e.g., shown in Table 5) simultaneously. In some implementations (e.g., when the LTE-V2X Resource configuration is provided based on the Dual-Connectivity structures), the UE may need to build signaling radio bearer (e.g., SRB3) with the serving eNB or serving gNB (e.g., signaling radio bearer associated with a PSCell built by the serving eNB or serving gNB). Therefore, the UE may be configured with an LTE-V2X Resources through the SRB3 without the relaying of PCell while the serving eNB/gNB is the secondary node (SN) in the Dual-Connectivity structure. In some other implementations, the configured LTE-V2X Resources may be generated by the serving eNB/gNB and the UE may obtain the LTE-V2X Resource configuration through the relaying of a Master Node, which may be an eNB or an gNB.

In some of the present implementations, the LTE-V2X Resources may be provided during a handover procedure. For example, the eNB/gNB in Table 5 may be the target node (which may build the target cell to which the UE may move during the handover procedure). In this condition, the target node may determine the configured LTE-V2X resource(s) for the UE. In addition, the LTE-V2X resource(s) configuration may be relayed by the serving cell when the serving cell initiates the handover procedure (e.g., the serving cell, which may be an NR cell or an LTE cell, may send RRC signaling with the information element 'reconfiguration-WithSync' message based on the NR protocols or RRC signaling with the information element 'mobilitycontrolinfoV2X' message based on the LTE protocols) to the UE to initiate the handover procedure. In some of the present implementations, the LTE-V2X resource configuration (e.g., sidelink resource pool configuration or Type 1 sidelink configured grant) may be included in the 'reconfigurationWithSync' message (or 'mobilitycontrolinfoV2X' message). Therefore, the UE may implement the LTE-V2X service by accessing the configured LTE-V2X resource during the handover procedure. In some of the present implementations, the UE may be able to access the configured sidelink resource (pool) during the handover procedure immediately after receiving the configuration of the LTE-V2X resource.

In some other implementations, the configured sidelink resource (pool) may be valid only to the target cell and so the UE may be able to access the configured sidelink resource (pool) after the UE handovers to the target cell successfully (e.g., after the UE sends an RRCConnectionReconfigurationComplete message to the target cell). For example, for the eNB/gNB scheduling approach and the Type 2 configured grant approach, the UE may need to receive the DCI from the target cell (e.g., after the UE handovers to the target cell successfully) to obtain the physical resource locations of the dynamic sidelink grant/Type 2 configured grant. In some implementations, the UE may start accessing the configured sidelink resource pool after the UE sends an RRCConnectionReconfigurationComplete message to the target cell.

TABLE 5

| LTE-V2X Resource Configuration | |
|---|---|
| eNB/gNB configures Tx/Rx-Resource Pool configuration | 1. Location of physical radio resource<br>2. Periodicity of configured grant (based on the frame structure and reference timing of allowed synchronization reference). |
| eNB scheduling | eNB scheduling = {true, false}<br>if true, UE may receive sidelink dynamic grant by receiving dedicated control signaling (e.g., DCI) of the LTE cell |
| eNB/gNB provides sidelink configured grant | 1. Location of physical radio resource<br>2. Periodicity of configured grant (based on the frame structure and reference timing of NR-RAN)<br>Type 1 and Type 2 sidelink configured grant may be supported |
| gNB scheduling | gNB scheduling = {true, false}<br>if true, UE may receive sidelink dynamic grant by receiving the dedicated control signaling (e.g., DCI) of the NR cell |
| Exceptional pool | Exceptional pool is configured for UE to transmit sidelink data only during some specific scenarios. |

In some of the present implementations, an applicable area may also be configured to indicate the areas in which (part of) the configured LTE-V2X SL configuration may be valid. There are some possible approaches to define the applicable area, such as using a EUTRAN-PhysicalCellidentity list, an NR-RAN-physicalCellidentity list, an NR-RAN-RANAC list, a EUTRAN-Tacking Area Code (TAC) list or an NR-RAN-TAC list, and a Geographical Area configuration.

In some of the present implementations, a list of EUTRAN physical cell identity may be included in the LTE-V2X SL configuration to indicate that the given LTE-V2X SL configuration may be applicable if the serving (E-UTRAN) cell for the UE belongs to the group of cells indicated by the EUTRAN-PhysicalCellidentity list. In some of the present implementations, the EUTRAN-PhysicalCellidentity list may be provided only when one LTE cell is configured (e.g., to be the PSCell) to support the LTE-V2X service. In contrast, the UTRAN-PhysicalCellidentity list may not be provided if there is no E-UTRAN around the UE in some of the present implementations. In some aspects of the present implementations, the EUTRAN-PhysicalCellidentity list may be replaced by an EUTRAN-Cellidentity list to define the applicable area of the given LTE-V2X SL configuration.

In some of the present implementations, the UE may be able to access the LTE-V2X SL configuration while the UE is connecting with the NR-RAN. In some of such implementations, a list of NR-RAN physical cell identity may be included in the LTE-V2X SL configuration to indicate that the given LTE-V2X SL configuration may be applicable if the serving (NR-RAN) cell belongs to the group of cells indicated by the NR-RAN-physicalCellidentity list. In some aspects of the present implementations, the NR-RAN-PhysicalCellidentity list may be replaced by an NR-RAN-Cellidentity list to define the applicable area of the given LTE-V2X SL configuration.

In some of the present implementations, the UE may be able to access the LTE-V2X SL configuration while the UE is connecting with the NR-RAN in some specific RAN Notification Areas (RNAs). In some of such implementations, each NR-cell may broadcast its own RAN Notification Area Code (RANAC) in its own system information. As such, based on the configured NR-RAN-RNAC list, the UE may be able to check whether the configured LTE-V2X SL configuration is still applicable when the UE is moving between the NR cells, and between the different RNAs.

In some of the present implementations, an EUTRAN-TAC list or an NR-RAN-TAC list may be provided to define the LTE-V2X validity area configuration. In some of the present implementations, the valid area of the LTE-V2X SL configuration may include any combination of {EUTRAN-PhysicalCellidentity list/EUTRAN-Cellidentity list, NR-RAN-physicalCellidentity list/NR-RAN-Cellidentity list, NR-RAN-RNAClist, EUTRAN-TAC list, NR-RAN-TAC list}.

In some of the present implementations, the UE may be able to access the LTE-V2X SL configuration based on a geographical area, which may be defined based on the GNSS. In some aspects of the present implementations, the UE may also be able to obtain its own location information using the GNSS. Therefore, in some of such implementations, the UE may be able to check whether the UE is still capable of accessing the configured LTE-V2X SL configuration. Table 6 below summarizes the validity area configuration included in the LTE-V2X SL configuration.

to reuse the stored LTE-V2X SL configuration after the UE moves back to an NR RRC Connected state. In some implementations, the UE may release the stored LTE-V2X SL configuration after the UE moves out of the validity area of the configured LTE-V2X SL configuration. It should be noted that the above described rules may also be applicable to an NR-V2X SL configuration.

In some of the present implementations, the UE may be allowed to transmit/receive sidelink packets based on the given LTE-V2X SL configuration while the UE is in an NR RRC Connected state and/or an NR RRC Inactive state. This condition may happen when the UE synchronizes with the E-UTRAN and a Tx sidelink radio resource pool is configured in the LTE-V2X SL configuration and, as such, the UE may select a sidelink radio resource itself (e.g., mode 4 in the LTE sidelink radio resource access mechanisms). In addition, by staying in the NR RRC Inactive state, the UE may still resume the NR RRC connection to update the NR RRC configuration (which may include the LTE-V2X SL configuration) with the NR RAN efficiently.

In some of the present implementations, the UE may request for updating the LTE-V2X SL configuration (e.g., along with at least one of other triggering events, such as an RNA update request) in the RRC Connection Resume Request message sent to the serving cell. In some of such implementations, the UE may not be able to trigger an RRC Connection Resume procedure only due to expiration of the stored multi-RAT SL configuration. In some of the present implementations, the update procedure for the LTE-V2X SL

TABLE 6

| LTE-V2X-SCG validity area configuration | |
|---|---|
| EUTRAN-PhysicalCellidentity list | Includes at least one E-UTRAN physical cell identity, which may indicate that the configured LTE-V2X SL configuration is valid while (at least) one of the serving cells of the UE belongs to this list. In some of the present implementations, the EUTRAN-physicalCellidentity may be replaced by EUTRAN-Cellidentity, which is broadcasted by LTE cells in LTE-SIB1. |
| NR-RAN-physicalCellidentity list | Includes at least one NR physical cell identity, which may indicate that the configured LTE-V2X SL configuration is valid while (at least) one of the serving cells of the UE belongs to this list. In some of the present implementations, the NR-RAN-physicalCellidentity may be replaced by NR-RAN-Cellidentity, which is broadcasted by NR cells in NR-SIB1. |
| NR-RAN-RANAClist | Includes at least one NR RAN Notification Area Code, which may indicate that the configured LTE-V2X SL configuration is valid while (at least) one of the serving cells of the UE belongs to the RNA in this list. |
| EUTRAN-Tacking Area Code(TAC) list | Includes at least one EUTRAN Tracking Area Code, which indicates that the configured LTE-V2X SL configuration is valid in the indicated tracking area(s) of EUTRAN. |
| NR-RAN-Tacking Area Code(TAC) list | Includes at least one NR Tracking Area Code, which indicates that the configured LTE-V2X SL configuration is valid in the indicated tracking area(s) in the NR-RAN. |
| Geographical Area configuration | Geographical area may be defined based on GNSS. |

In some of the present implementations, a UE may be allowed to transmit/receive sidelink packets based on the given LTE-V2X SL configuration only when the UE is in an NR-RRC Connected state. This condition may happen when the sidelink radio resource is indicated by the NR cell through dedicated control signaling (e.g., Downlink Control Information). Therefore, in some of the present implementations, the UE may directly release the configured LTE-V2X SL configuration automatically after the UE moves to an NR RRC Inactive state or an RRC Idle state. In some other implementations, the UE may still store the configured LTE-V2X SL configuration and, as such, the UE may be able configuration and the other RRC Connection Resume procedure (e.g., RRC Connection Resume procedure for RNA update) may be independent from other triggering events. As such, in some of such implementations, the UE may request resuming its RRC Connection for LTE-V2X SL configuration every time that the UE leaves the applicable areas of the stored LTE-V2X SL configuration.

In some of the present implementations, different LTE-V2X SL configurations, where one is for the LTE-V2X service when the UE is in an RRC Connected state and the other one is for the LTE-V2X service when the UE is in an RRC Inactive state, may be configured to the UE. In some of such implementations, the UE may select and apply different configurations based on its different NR RRC states. Moreover, when the UE is in the RRC Inactive state, the RNA of the UE may include areas across different PLMNs.

As an example, as shown in Table 7 below, {Cell #a~Cell #f} are configured as the UE's RAN Notification Area. In addition, {Cell #a, Cell #b} belong to PLMN #A, which is the UE's registered PLMN; {Cell #c, Cell #d} belong to PLMN #B, which is one of the UE's equivalent PLMN(s); and {Cell #e, Cell #f} belong to PLMN #C, which is another one of the UE's equivalent PLMN(s). In some of the present implementations, different sidelink resource configurations, which may include sidelink Tx resource (pool) configuration and sidelink Rx resource pool configuration, may be provided to different PLMNs. As such, the UE may apply the configured sidelink resource based on the indicated cell identity and the corresponding PLMN, while the UE is moving within the configured validity area associated with the corresponding PLMN.

Additionally, in some of the present implementations, each sidelink resource configuration for a different PLMN may configure (at least) different transmission resource configurations (e.g., different Tx sidelink resource pools for each PLMN) to the UE. Therefore, according to Table 7 below, the UE may access the LTE-V2X service based on the configured SL-resource configuration #A, while the UE's serving cell is Cell #a/Cell #b; the UE may access the LTE-V2X service based on the configured SL-resource configuration #B, while the UE's serving cell is Cell #c/Cell #d; the UE may access the LTE-V2X service based on the configured SL-resource configuration #B, while the UE's serving cell is Cell #c/Cell #d; and the UE may access the LTE-V2X service based on the configured SL-resource configuration #C, while the UE's serving cell is Cell #e/Cell #f. In some aspects of the present implementations, the UE may apply only one configured Sidelink Resource Configuration while the UE is moving within the configured RNA and the RNA is the validity area (associated with one corresponding PLMN).

nication type (associated with each NR-Destination ID) configuration, NR-V2X-frequency carrier configuration, NR-V2X synchronization configuration, NR-V2X resource configuration, NR-V2X validity area configuration, and NR-V2X-SCG measurement configuration. Each of these configurations is described in detail in the following paragraphs.

Figure 10:
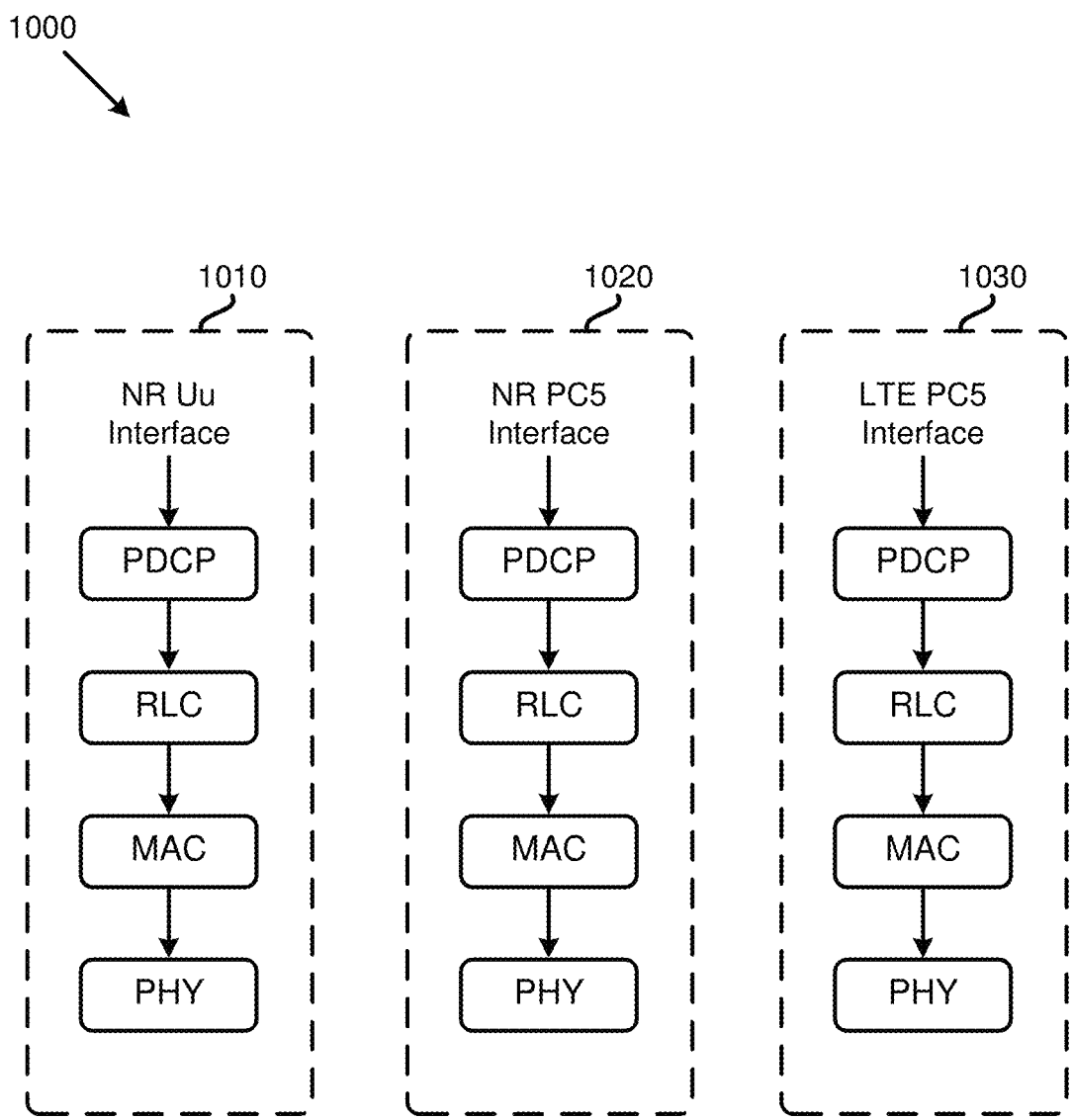
FIG. 10 is a schematic architecture illustrating different sidelink configurations for an LTE-V2X service and an NR-V2X service supported by an NR Uu interface, according to one example implementation of the present application.

FIG. 10 is a schematic architecture 1000 illustrating different sidelink configurations for an LTE-V2X service and an NR-V2X service supported by an NR Uu interface, according to one example implementation of the present application. As illustrated, FIG. 10 includes an NR Uu configuration 1010, an NR PC5 configuration 1020, and an LTE PC5 configuration 1030. In some of the present implementations, a serving cell may provide sidelink configuration for a Uu interface and different PC5 interfaces through dedicated control signaling. For example, in a DC architecture, an NR cell may provide an MCG configuration for an NR Uu interface, one or more NR-V2X SCG configurations for an NR PC5 interface, and one or more LTE-V2X SCG configurations for an LTE PC5 interface, for example, through an RRCConnectionReconfiguration message, based on the NR protocol.

The sidelink configuration may include configurations for the UE to realize both NR PC5 and LTE PC5 interfaces. As shown in FIG. 10, in some of the present implementations, the sidelink configuration may provide an NR-PDCP layer configuration, an NR-RLC layer configuration, an NR-MAC layer configuration, and an NR-PHY layer configuration to the PDCP layer, RLC layer, MAC layer, and PHY layer of the UE, respectively. Similarly, the sidelink configuration may provide an LTE-PDCP layer configuration, an LTE-RLC layer configuration, an LTE-MAC layer configuration, and an LTE-PHY layer configuration to the PDCP layer, RLC layer, MAC layer, and PHY layer of the UE, respectively.

In some of the present implementations, the NR-Source ID provided in the NR-V2X SL configuration may be different from the source ID in the LTE-V2X configuration.

TABLE 7

| RAN Notification Area | Associated PLMN | Sidelink Resource Configuration |
|---|---|---|
| Cell#a, Cell#b | PLMN#A (Registered PLMN) | SL-resource configuration#A |
| Cell#c, Cell#d | PLMN#B (Equivalent PLMN) | SL-resource configuration#B |
| Cell#e, Cell#f | PLMN#C (Equivalent PLMN) | SL-resource configuration#C |

In some of the present implementations, the UE may be allowed to transmit/receive sidelink packets based on the given LTE-V2X SL configuration while the UE is in an NR RRC idle state. This condition may happen while (part of) the LTE-V2X SL configuration is broadcasted by the NR cell (e.g., through system information delivery approach). In some of the present implementations, the NR cell may broadcast the LTE-V2X SL configuration continuously or based on the system information-on-demand approach (e.g., as described in the 3GPP New Radio Release 15).

As described above, two examples of the multi-RAT SL configuration may include the LTE-V2X SL configuration and the NR-V2X SL configuration. With the advance of NR design, some advanced designs in NR may also apply to the PC5 interface for sidelink packet communication. An NR-V2X SL configuration, in some of the present implementations, may include, but is not limited to, NR-Source ID configuration, NR-Destination ID(s) configuration, commu- In some of such implementations, a Tx UE may indicate its NR-Source ID in the SSB (e.g., when the UE is a SyncRef UE) or in the sidelink control information delivery. Also, in some of the present implementations, more than one NR-Source ID may be configured to the UE and some of the NR-Source IDs may be linked to a specific SL-SSB (sidelink-synchronization burst). In some of the present implementations, different NR-Source IDs may be mapped to different SSBs for different service types.

Figure 11:
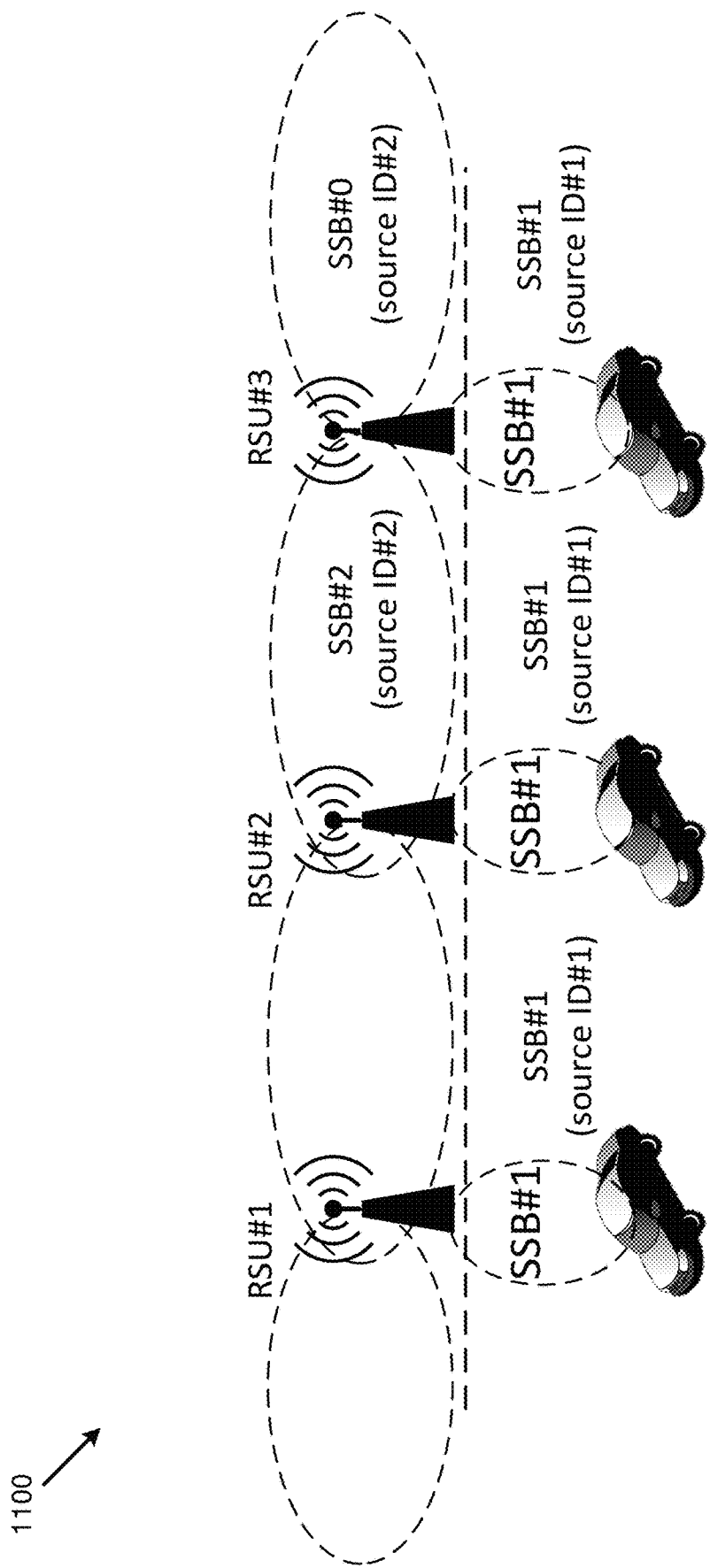
FIG. 11 is a map of an area illustrating several roadside units (RSUs) being deployed along with a road, according to one example implementation of the present application.

FIG. 11 is a map 1100 of an area illustrating several roadside to units (RSUs) being deployed along with a road, according to one example implementation of the present application. FIG. 11 will be described with reference to Table 8 below, which illustrates different NR-Source IDs (e.g., Source ID #1 and Source ID #2), shown in FIG. 11, may be linked to different SL-SSBs, for example, when the UE communicates with different target UEs through different SL-SSBs. As shown in Table 8, vehicles on the road may receive sidelink packets from different RSUs (e.g., RSU #1, RSU #2, and RSU #3) with the same NR-Source ID (e.g., Source ID #1). That is, a vehicle may not need to further distinguish the information from RSUs and, as such, all the sidelink packets from an RSU may be labelled with the same NR-Source ID (e.g., Source ID #1 in this example).

Conversely, an RSU (e.g., the RSU #3) may indicate a different NR-Source ID (e.g., Source ID #2) in different SL-SSBs (e.g., SL-SSB #0 and SL-SSB #2), while the RSU is communicating with other RSUs (e.g., RSU #2), as shown in the FIG. 11. In some of the present implementations, the NR-Source ID may be configured in the upper layers (e.g., a NAS layer, or a V2X application layer) or may be configured by the serving NR cell.

TABLE 8

| SL-SSB configuration | NR-Source ID |
|---|---|
| SL-SSB#0 | NR-Source ID#2 |
| SL-SSB#1 | NR-Source ID#1 |
| SL-SSB#2 | NR-Source ID#2 |

In some of the present implementations, at least one NR-V2X group may be configured in the NR-V2X SL configuration and each NR-V2X group may be configured to the UE with a unique NR-Destination ID. In some of the present implementations, the NR-Destination ID may be configured in a NAS layer or may be configured by the serving NR cell.

In some of the present implementations, different communication types (e.g., unicast, multicast, or broadcast) may be further indicated to each corresponding {NR-Source ID, NR-Destination ID} in the NR-V2X SL configuration. In some of such implementations, based on the different communication types, the NR-Destination ID may have different meanings. Table 9 below illustrates different communication types that may affect the configurations in different sublayers in the NR-V2X SL configuration (e.g., for one NR Destination ID).

As shown in Table 9, in some of the present implementations, an NR-Destination ID may represent one specific UE if the communication type is indicated as unicast. Moreover, for a unicast sidelink communication, the Hybrid Automatic Repeat reQuest (HARQ) and Automatic Repeat reQuest (ARQ) may be further supported in the RLC layer and PHY layer, respectively, and therefore the NR-V2X SL configuration may further configure (at least one) RLC bearer for the unicast sidelink communication. Also, the sidelink measurement configuration (e.g. NR-V2X SL measurement configuration) for a specific target NR-V2X UE may be further indicated, for example, when the communication type is unicast. Conversely, for multicast and broadcast communication types, in some of the present implementations, the NR-Destination ID may represent a group of UEs (e.g., an NR-V2X Group, which may be configured by the NAS layer or the AS layer).

TABLE 9

| Communication Type | Note |
|---|---|
| Unicast | RLC-bearer configuration |
| | (with ARQ configuration (e.g., ARQ feedback message delivery) in |
| | RLC layer and HARQ configuration (e.g., HARQ feedback message |
| | delivery) and sidelink measurement configuration in PHY layer) |
| Multicast | MAC/PHY configuration |
| | (without ARQ feedback message/HARQ feedback message/sidelink |
| | measurement configuration) |
| | (PDCP/RLC sublayer may be absent) |
| Broadcast | MAC/PHY configuration |
| | (without ARQ/HARQ/sidelink measurement configuration) |
| | (PDCP/RLC sublayer may be absent) |

In some of the present implementations, an NR-V2X service may be implemented on different frequency carriers with the frequency carriers for LTE-V2X services. So, different Absolute Radio Frequency Channel Numbers (ARFCNs) or (NR-ARFCN) may be provided in the frequency configuration. In addition, the NR-V2X-frequency carrier may be located on FR1 (<6 GHz) or FR2 (>6 GHz). In some of the present implementations, if the NR-V2X-frequency carrier is absent, the NR-V2X service may be applied on the same frequency carrier(s) as the LTE-V2X service.

In some of the present implementations, beamforming may be configured in the physical layer of an NR PC5 interface as one of the possible synchronization references. As described above, in some of the present implementations, a gNB may not be considered as a synchronization reference and therefore, beamforming may not be supported for an LTE PC5 interface. By contrast, the PHY layer in the NR PC5 interface may include a gNB as one of the synchronization references for the UE, hence the synchronization references for an NR PC5 may be one or more of {eNB, gNB, LTE-UE, NR-UE, GNSS}. It should be noted that an LTE-UE is a UE that may achieve synchronization with an LTE-RAN while an NR-UE is a UE that may achieve synchronization with an NR-RAN. Since a gNB may be one of the synchronization references for an NR PC5 interface, beamforming may be supported for the NR PC5 interface in some of the present implementations. Therefore, a UE may transmit/receive SLSS and sidelink packets with beam sweeping on the NR PC5 interface.

Additionally, in some of the present implementations, the NR cell may configure the UE to become a SyncRef UE with broadcasting SLSS periodically with beam sweeping. Also, to achieve beam sweeping on NR PC5 interface, in some of the present implementations, the UE may need to inform the serving NR cell of the UE's capability regarding the beamforming (e.g., through a parameter, such as the UEAssistanceInformation).

In some of the present implementations, in the NR-V2X synchronization configuration, a syncTxThreshold with different RATs (e.g., LTE-eNB, NR-gNB, etc.) may be configured to the UE. As such, the UE may determine whether to become a SyncRef UE itself, for example, by referring to the synchronization reference (e.g., eNB or gNB) and the corresponding thresholds (e.g., syncTxThreshold-eNB or syncTxThreshold-gNB). Table 10 below illustrates different syncTxThreshold-eNB/syncTxThreshold-gNB values that may be provided in an NR-V2X synchronization configuration.

TABLE 10

| syncTxThreshold-eNB parameters | Notes |
| --- | --- |
| syncTxThreshold-eNB (=x_eNB dB) | UE may become a syncRef UE if the UE selects an eNB as a synchronization reference and the RSRP value of the corresponding eNB is lower than the x_eNB dB. |
| syncTxThreshold-gNB (=x_gNB dB) | UE may become a syncRef UE if the UE selects a gNB (which broadcasts SSB set periodically through beamforming) as a synchronization reference and the RSRP value of the corresponding gNB is lower than the x_gNB dB. |

In some of the present implementations, a SyncRef UE may also broadcast MIB-SL periodically with the SLSS. In some of such implementations, the two parameters syncOffsetIndicator-eNB and syncOffsetIndicator-gNB may also be configured to the UE. As such, the UE may select a corresponding direct frame number (DFN) to broadcast the MIB-SL, for example, based on the following formulas:

If the synchronization source is eNB:

10*DFN-eNB+subframe number-eNB)mod 40=syncOffsetIndicator-eNB;

If the synchronization source is gNB:

10*DFN-gNB+subframe number-gNB)mod 40=syncOffsetIndicator-gNB;

Different radiation power configurations (e.g., TxPowerParameters-NR and TxPowerParameters-LTE) may be provided to the UE through the NR-V2X SL configuration in some of the present implementations. The UE may apply the TxPowerParameters-LTE when the synchronization reference of the NR PC5 interface is an LTE-eNB. By contrast, the UE may apply the TxPowerParameters-NR when the synchronization reference of the NR PC5 interface is an NR-gNB. Each Tx power parameter, in some of the present implementations, may include the P0 and alpha values in different sidelink physical channels, which may include {PSSS, PSSCH, PSCCH, PSDCH}. Table 11 below illustrates the Tx power parameters for a UE to transmit sidelink packets on an NR PC5 interface in some of the present implementations.

TABLE 11

| Sidelink power configuration | Tx power parameters |
|---|---|
| TxPowerParameters-LTE | $P0_{lte\text{-}omni}$, $alpha_{PSSS\text{-}lte}$, $alpha_{PSSS\text{-}lte}$, $alpha_{PSSCH\text{-}lte}$, $alpha_{PSCCH\text{-}lte}$, $alpha_{PSDCH\text{-}lte}$, |
| TxPowerParameters-NR-omni | $P0_{nr\text{-}omni}$, $alpha_{PSSS\text{-}nr\text{-}omni}$, $alpha_{PSSS\text{-}nr\text{-}omni}$ $alpha_{PSSCH\text{-}nr\text{-}omni}$, $alpha_{PSCCH\text{-}nr\text{-}omni}$, $alpha_{PSDCH\text{-}nr\text{-}omni}$, |

For the alpha value configuration: al0 may correspond to 0, al04 may correspond to value 0.4, al05 to 0.5, al06 to 0.6, al07 to 0.7, al08 to 0.8, al09 to 0.9 and al1 may correspond to 1. This field may apply for sidelink power control.
PSSS: physical sidelink synchronization signal.
PSSCH: physical sidelink shared channel.
PSDCH: physical sidelink discovery channel.
PSCCH: physical sidelink control channel.

In some of the present implementations, a UE may need to support both LTE-V2X service and NR-V2X service simultaneously. The radiation power, however, for sidelink operation in the UE side may be limited. As a result, the UE may not be able to afford simultaneous sidelink packet transmissions on both LTE-V2X service ($P_{LTE\text{-}V2X}$) and NR-V2X service ($P_{NR\text{-}V2X}$), which means that the condition $P_{LTE\text{-}V2X}+P_{NR\text{-}V2X}>P_{SL\text{-}MAX}$ (i.e., $P_{SL\text{-}MAX}$ is the maximum power the UE may apply for a sidelink packet delivery) may happen.

To address the above-mentioned issue, in some of the present implementations, the LTE-V2X service may always have higher priority than the NR-V2X service. Therefore, a UE may first fulfill the sidelink transmission power requirement for sidelink packet transmission of LTE-V2X service and then the remaining radiation power may be applied to the sidelink packet transmission for the NR-V2X service. In contrast, in some implementations, the NR-V2X service may always have higher priority than the LTE-V2X service, and so the UE may first fulfill the sidelink transmission power requirement for the sidelink packet transmission of the NR-V2X service and the remaining radiation power may be applied to the sidelink packet transmission for the LTE-V2X service. In some other aspects of the present implementations, the UE may perform dynamic power adjustment between the NR-V2X service and the LTE-V2X service, for example, when $P_{LTE\text{-}V2X}+P_{NR\text{-}V2X}>P_{SL\text{-}MAX}$.

In some of the present implementations, only one set of parameters {SLSSID, syncTxThreshold, syncOffsetIndicator, TxPowerParameters} may be provided to the UE in the NR-V2X synchronization configuration. As a result, the UE may become a syncRef UE based on the given parameters, which may be independent from the type of the selected synchronization reference.

In some of the present implementations, the NR-V2X Resource configuration may be implemented by referring to the approaches in the LTE-V2X Resource Configuration (e.g., shown in Table 12 below). For example, in some implementations, the UE may obtain the NR sidelink physical resource(s) through different approaches (e.g., shown in Table 12) simultaneously. In some implementations (e.g., while NR-V2X Resource configuration is provided based on the Dual-Connectivity structures), a UE may need to build signaling radio bearer (e.g., SRB3) with the serving eNB or serving gNB (e.g., signaling radio bearer associated with a PSCell built by the serving eNB or serving gNB). Therefore, the UE may be configured with the NR-V2X Resources through the SRB3 without the relaying of a PCell while the serving eNB/gNB is the secondary node (SN) in the Dual-Connectivity structure. In some other implementations, the configured NR-V2X Resources may be generated by the serving eNB/gNB and the UE may obtain the NR-V2X Resource configuration through the relaying of a Master Node, which may be an eNB or a gNB.

In some of the present implementations, the NR-V2X Resources may be provided during a handover procedure. For example, the eNB/gNB in Table 12 may be the target node (which may build the target cell to which the UE may move during the handover procedure). During the handover procedure, the target node may determine the configured NR-V2X resource(s) for the UE. In addition, the NR-V2X resource(s) configuration may be relayed by the serving cell when the serving cell initiates the handover procedure (e.g., the serving cell, which may be an NR cell or an LTE cell, may send RRC signaling with the information element 'reconfigurationWithSync' message in the NR protocols or may send the RRC signaling with the information element 'mobilitycontrolinfoV2X' message in the LTE protocols to the UE to initiate handover procedure). Therefore, the NR-V2X resource configuration (e.g., sidelink resource pool configuration or Type 1 sidelink configured grant) may be included in the 'reconfigurationWithSync' message or 'mobilitycontrolinfoV2X' message. In some of the present implementations, the UE may implement the NR-V2X service by accessing the configured NR-V2X resource during the handover procedure. In some implementations, the UE may be able to access the configured sidelink resource (pool) during the handover procedure immediately after receiving the configuration of the NR-V2X resource.

In some other implementations, the configured sidelink resource (pool) may be valid only to the target cell and therefore, the UE may be able to access the configured sidelink resource (pool) after the UE handovers to the target cell successfully (e.g., after the UE sends an RRCConnectionReconfigurationComplete message to the target cell). For example, for the eNB/gNB scheduling approach and the Type 2 configured grant approach, the UE may need to receive the DCI from the target cell (after the UE handovers to the target cell successfully) to obtain the physical resource locations of the dynamic sidelink grant/Type 2 configured grant. In some implementations, the UE may start accessing the configured sidelink resource pool after the UE sends an RRCConnectionReconfigurationComplete message to the target cell.

RRC configuration and the scheduled sidelink resource indicated by the NR-DCI. In some of the present implementations, after the configured grant is activated by an NR-DCI, the serving cell (e.g., an eNB) may deactivate the activated configured grant by another NR-DCI.

In some of the present implementations, there may only be one configured grant configuration for each V2X frequency carrier. In some other aspects of the present implementations, more than one configured grant configuration may be assigned to each V2X frequency carrier, in which case, different periodicity and physical sidelink resource grants may be provided for each configured grant configuration.

In some of the present implementations, information related to beamforming may also be configured in the NR-V2X resource configuration. For example, in the exceptional sidelink resource pools configuration, one additional Beam Failure Event may be defined. This way, a UE may

TABLE 12

NR-V2X Resource Configuration

| | |
|---|---|
| gNB/eNB configures Tx/Rx-Resource Pool configuration | 3. Location of physical radio resource<br>4. Periodicity of configured grant<br>(based on the frame structure and reference timing of allowed synchronization reference). |
| gNB scheduling | gNB scheduling = {true, false}<br>if true, UE may receive sidelink dynamic grant by receiving dedicated control signaling (e.g., DCI) of the NR cell |
| gNB/eNB provides sidelink configured grant | 3. Location of physical radio resource<br>4. Periodicity of configured grant<br>(based on the frame structure and reference timing of NR-RAN)<br>Type 1 and Type 2 sidelink configured grant may be supported |
| eNB scheduling | gNB scheduling = {true, false}<br>if true, UE may receive sidelink dynamic grant by receiving the dedicated control signaling (e.g., DCI) of the serving LTE cell |
| Exceptional pool | Exceptional pool is configured for UE to transmit sidelink data only during some specific scenarios. |

In some of the present implementations, additional configurations for synchronization and beamforming for an NR-V2X UE may be provided in the NR-V2X resource configuration. For example, a base stations (e.g., a gNB) may be included in the allowed synchronization references for one specific sidelink resource pool. In some of the present implementations, a base station (e.g., a gNB) may provide configured grant for the UE to transmit sidelink packets of the NR-V2X service through dedicated control signaling (e.g., an RRCConnectionReconfiguration message).

Some of the present implementations may provide two types of sidelink configured grants, which are Type 1 and Type 2 configured grants. In some of the present implementations, the periodicity and scheduled sidelink resource in a Type 1 configured grant may be delivered through the RRC signaling and the UE may apply the configured grant directly after the sidelink data arrives (e.g., in the UE's buffer). For a Type 2 configured grant, in some other of the present implementations, the serving cell (or gNB) may activate the configured grant through another dedicated control signaling (e.g., NR-Downlink Control Information (NR-DCI)), which may provide a specific scheduled sidelink resource to the UE. In some of such implementations, after receiving the NR-DCI for activation of one configured grant, the UE may apply the configured grant by following the apply exceptional pools during a beam failure event (e.g., after the beam failure with gNB is detected in the MAC layer and before the UE decoding an NR-DCI encoded with the UE's C-RNTI successfully in the specific search space designated for a beam failure recovery).

Figure 12:
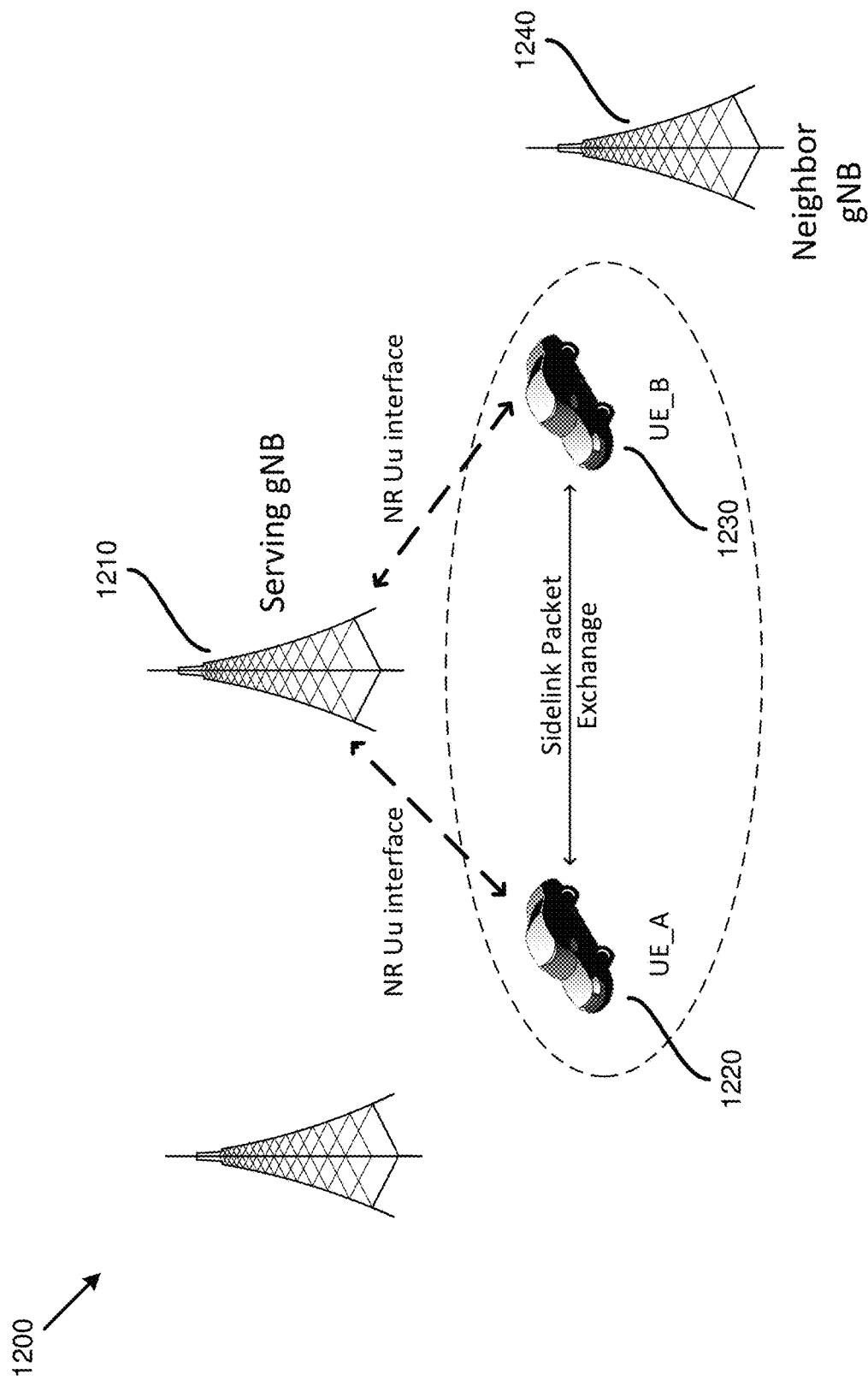
FIG. 12 is a map of an area illustrating configuring one or more UEs with NR-V2X measurement configuration, according to one example implementation of the present application.

As described above, NR-V2X validity area configuration is another configuration that may be included in an NR-V2X SL configuration in some of the present implementations. The design and description of NR-V2X validity area configuration may be similar to the LTE-V2X-SCG validity area configuration, as described above, in many aspects, and may be different in other aspects In some of the present implementations, through the NR-V2X SL configuration, a base station (e.g., a gNB) may also configure measurement configuration to a UE. FIG. 12 is a map 1200 of an area illustrating configuring one or more UEs with NR-V2X measurement configuration, according to one example implementation of the present application. FIG. 12 will be described with reference to Table 13 below, which illustrates an example implementation of the NR-V2X measurement configuration.

As shown in FIG. 12, the base station (e.g., a gNB) 1210 may configure measurement configuration to the UE 1220 (i.e., vehicle UE_A) to report the sidelink Channel Quality (e.g., the received sidelink RSRP (S-RSRP) of the indicated Reference Signal) between the UE 1220 and another UE 1230 (i.e., vehicle UE_B), or channel busy ratio of one or more sidelink resource pools. As shown in FIG. 12, the UEs 1220 and 1230 are in the same ProSe Group for sidelink packet exchange and both of the UEs are served by the serving gNB 1210. As shown in Table 13 below, in some of the present implementations, the UE 1220 may need to provide two types of measurement reports, a RAN measurement report and a sidelink UE measurement report.

For a RAN measurement report, the UE 1220 may provide a measurement report of the serving cells (e.g., by gNB 1210) and/or neighbor cells (e.g., by gNB 1240) to the UE 1230. This is because all of the UEs in the ProSe group (e.g., UE_A 1220 and UE_B 1230) may need to be served by the same NR cell for the NR cell to be able to provide dynamic sidelink grant to the UEs 1220 and 1230 for sidelink packet exchange. As shown in Table 13, the triggering events provided may be the same as the existing LTE measurement report triggering events. However, the UE 1220 may report the measurement report to the UE 1230 if at least one of the triggering events is fulfilled. As such, the UE 1230 may be able to prepare a group handover to another target NR cell (e.g., the gNB 1240) with the UE 1220 in order to maintain the NR-V2X service.

For a Sidelink UE measurement report, in some of the present implementations, the UE 1220 may provide a measurement report to the serving base station (e.g., the gNB 1210) based on the given NR-V2X measurement configuration. As a result, the serving gNB 1210 may arrange the sidelink resource(s) for the UE 1220 and/or the UE 1230, based on the measurement report received from the UE 1220. In some of the present implementations, the measurement report triggered by the UE 1220 may indicate which UE(s) (e.g., the UE 1230) may be the target UE for the measurement.

In some other aspects of the present implementations, the UE 1220 may directly provide the measurement report to the UE 1230 through the sidelink channel established between the UE 1220 and UE 1230. This way, the UE 1230 may select the sidelink resource(s) based on the measurement report received from the UE 1220. The UE 1230 may also adjust its sidelink radiation power for the UE 1220 during the sidelink packet exchange based on the received measurement report in some of the present implementations.

In some of the present implementations, the UE 1220 may provide the measurement report to another UE (e.g., the UE 1230 or anther UE), which is a local manager to manage the sidelink resource allocation of the nearby sidelink UEs, through a sidelink channel.

TABLE 13

| | Sidelink Measurement Configuration |
|---|---|
| | RAN Measurement Report |
| Reference Signaling | 1. Synchronization Signal burst of serving Cell/Neighbor Cell |
| | 2. CSI-RS of serving Cell/Neighbor Cell |
| Triggering Event | A1 Serving Cell becomes better than threshold |
| | A2 Cell Serving becomes worse than threshold |
| | A3 Neighbor Cell becomes offset better than PCell |
| | A4 Neighbor Cell becomes better than threshold |
| | A5 PCell becomes worse than threshold1 and neighbor Cell becomes better than threshold2 |
| | A6 Neighbor Cell becomes offset better than serving cell |
| | C1 CSI-RS resource becomes better than threshold |
| | C2 CSI-RS resource becomes offset better than reference CSI-RS resource |
| | B1 Inter RAT (e.g., NR-V2X/LTE-V2X) neighbor Cell becomes better than threshold |
| | B2 PCell becomes worse than threshold1 and inter RAT neighbor becomes better than threshold2 |
| | Sidelink UE Measurement Report |
| Target UE | UE Identity (e.g., NR-Source ID of UE_B) |
| Target | Reference Signal: |
| | 1. Synchronization Signal burst |
| | 2. Sounding Reference Signal |
| | 3. DMRS (Demodulation Reference Signal) |
| | Channel Busy Ratio (CBR) |
| Triggering Event | 1. The received signal strength of indicated reference signal (e.g., S-RSRP) is lower than a predefined threshold. |
| | 2. The received signal strength of indicated reference signal (e.g., S-RSRP)) is higher than a predefined threshold. |
| | 3. The CBR (of one or more than one sidelink resource pools) is higher than a predefined threshold. |
| | 4. The CBR (of one or more than one sidelink resource pools) is lower than a predefined threshold. |

As described above, some of the present implementations may support dual connectivity between an LTE-V2X service and an NR-V2X service. In some of the present implementations, an NR-PC5 interface may be configured to support the dual connectivity architecture, for example, to support both LTE-V2X service and NR-V2X service simultaneously.

Figures 13A, 13B:
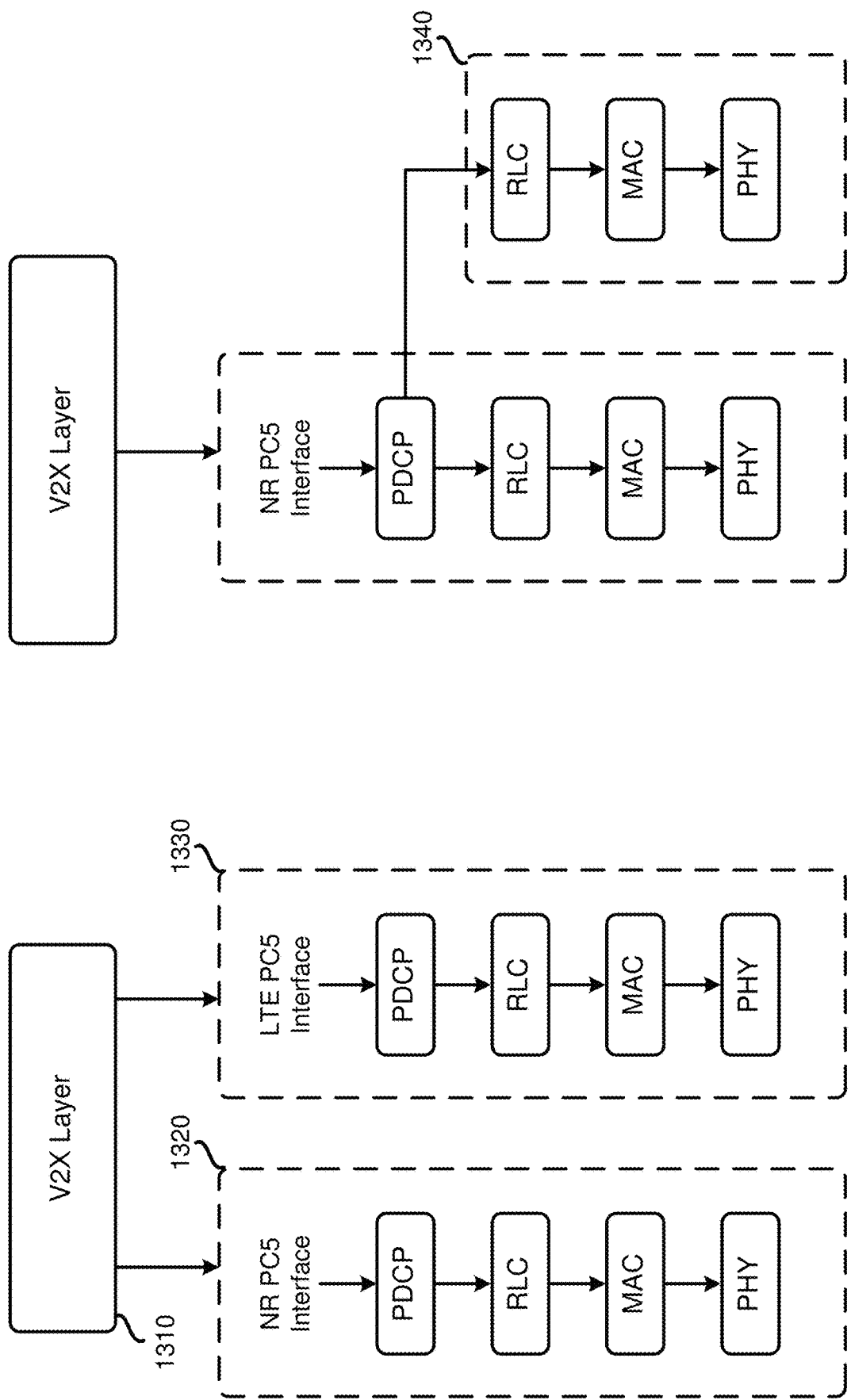
FIG. 13A illustrates configuring a UE with multi-RAT SL configuration in a dual connectivity scenario, according to one example implementation of the present application.
FIG. 13B illustrates sidelink packet duplication in multi-RAT SL configuration, according to one example implementation of the present application.

FIG. 13A illustrates configuring a UE with multi-RAT SL configuration in a dual connectivity scenario, according to one example implementation of the present application. As shown in FIG. 13A, an NR-V2X-MCG 1320 may be configured by a V2X layer 1310 to support an NR PC5 interface. In some of the present implementations, the V2X layer 1310 may include a V2X application layer and a V2X adaptation layer. At the same time, the V2X layer 1310 may configure an LTE-V2X-SCG 1330 to support an LTE PC5 interface. That is, the LTE-V2X-SCG 1330 may be provided to the UE as an SCG configuration on the PC5 interface. As such, when a V2X packet is provided by an upper layer (e.g., a V2X application layer), the V2X packet may be transmitted through either the NR PC5 interface or the LTE PC5 interface. Which PC5 interface to be used may be decided based on the QoS requirements of the V2X service in some of the present implementations.

Additionally, some of the present implementations may provide sidelink packet duplications in the lower layers of an NR PC5 interface by configuring one additional leg/path (e.g., an RLC bearer). FIG. 13B illustrates sidelink packet duplication in multi-RAT SL configuration, according to one example implementation of the present application. As shown in the figure, an additional path 1340 may be configured based on the above-described LTE-V2X-SCG configuration (so, the sub-layers in the path 1340 may be configured based on the LTE-V2X SCG configuration). In some other aspects of the present implementations, the additional path 1340 may be realized based on NR-V2X-SCG configuration (so, the sub-layers in the path 1340 may be configured based on the NR-V2X SCG configuration). In some of the present implementations, a sidelink packet duplication may be decided by a ProSe Per Packet Reliability (PPPR) value (e.g., for sidelink packet with PPPR=1 or 2) and/or a ProSe Per Packet Priority (PPPP) value (e.g., for sidelink packet with PPPP=1 or 2) per sidelink packet. Moreover, the described LTE-V2X-SCG configuration and NR-V2X-SCG configuration may also be applicable when dual-connectivity is supported for the LTE-PC5 interface and NR-PC5 interface.

Figure 14:
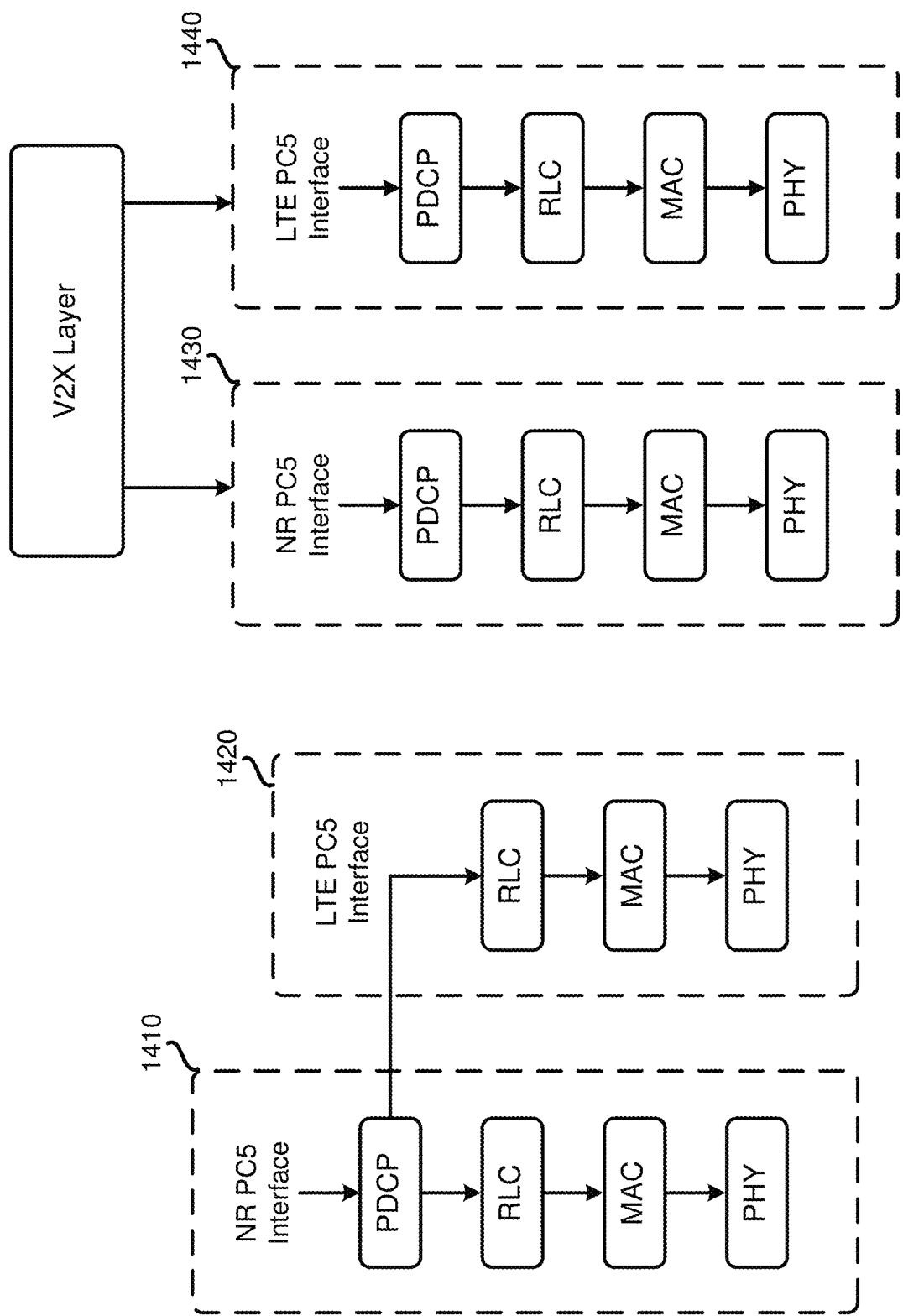
FIG. 14 illustrates configuring a UE with multi-RAT SL configuration, according to one example implementation of the present application.

In some of the present implementations, the dual-connectivity configuration on an NR/LTE PC5 interface may co-exist with the dual-connectivity configuration on an NR/LTE Uu interface. FIG. 14 illustrates configuring a UE with multi-RAT SL configuration, according to one example implementation of the present application. As shown in FIG. 14, the NR-V2X-MCG configuration 1430 and/or an LTE-V2X-SCG configuration 1440 may be configured, along with an MCG-configuration 1410 and/or SCG-configuration 1420, independently. In some of the present implementations, the NR-V2X-MCG configuration 1430, LTE-V2X-SCG configuration 1440, the MCG-configuration 1410, and the SCG-configuration 1420 may be configured to the UE via a dedicated control signaling. In some aspects of the present implementations, the dual-connectivity configuration shown in FIG. 13B may also be configured along with an MR-DC dual-connectivity independently.

Figure 15:
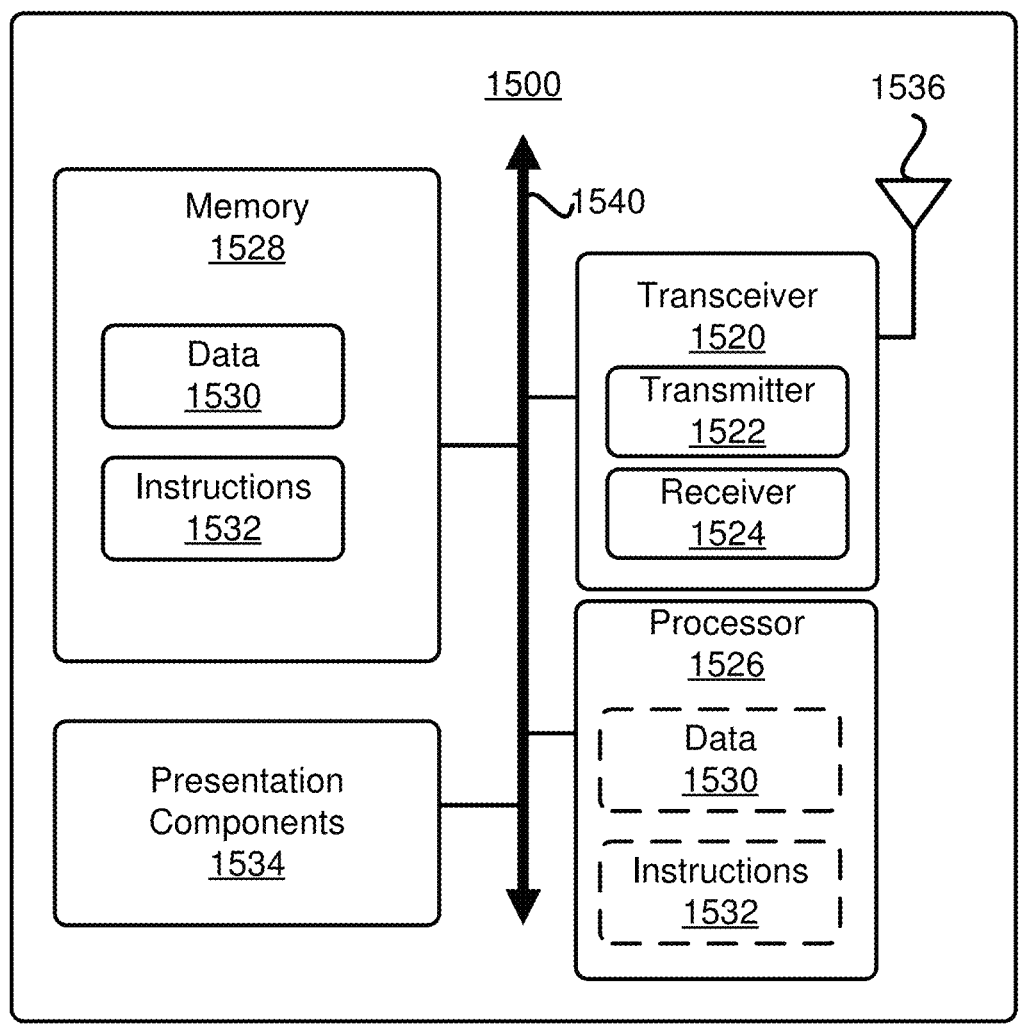
FIG. 15 illustrates a block diagram of a node for wireless communication, according to one example implementation of the present application.

FIG. 15 illustrates a block diagram of a node for wireless communication, according to one example implementation of the present application. As shown in FIG. 15, node 1500 may include transceiver 1520, processor 1526, memory 1528, one or more presentation components 1534, and at least one antenna 1536. Node 1500 may also include a Radio Frequency (RF) spectrum band module, a base station communications module, a network communications module, and a system communications management module, input/output (I/O) ports, I/O components, and power supply (not explicitly shown in FIG. 15). Each of these components may be in communication with each other, directly or indirectly, over one or more buses 1540.

Transceiver 1520 having transmitter 1522 and receiver 1524 may be configured to transmit and/or receive time and/or frequency resource partitioning information. In some implementations, transceiver 1520 may be configured to transmit in different types of subframes and slots including, but not limited to, usable, non-usable and flexibly usable subframes and slot formats. Transceiver 1520 may be configured to receive data and control signaling.

Node 1500 may include a variety of computer-readable media. Computer-readable media can be any available media that can be accessed by node 1500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1528 may include computer-storage media in the form of volatile and/or non-volatile memory. Memory 1528 may be removable, non-removable, or a combination thereof. Exemplary memory includes solid-state memory, hard drives, optical-disc drives, and etc. As illustrated in FIG. 15, memory 1528 may store computer-readable, computer-executable instructions 1532 (e.g., software codes) that are configured to, when executed, cause processor 1526 to perform various functions described herein, for example, with reference to FIGS. 1 through 15. Alternatively, instructions 1532 may not be directly executable by processor 1526 but be configured to cause node 1500 (e.g., when compiled and executed) to perform various functions described herein.

Processor 1526 may include an intelligent hardware device, for example, a central processing unit (CPU), a microcontroller, an ASIC, and etc. Processor 1526 may include memory. Processor 1526 may process data 1530 and instructions 1532 received from memory 1528, and information through transceiver 1520, the base band communications module, and/or the network communications module. Processor 1526 may also process information to be sent to transceiver 1520 for transmission through antenna 1536, to the network communications module for transmission to a core network.

One or more presentation components 1534 presents data indications to a person or other device. For example, one or more presentation components 1534 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for configuring a first user equipment (UE) to exchange sidelink packets with at least a second UE, the method comprising:
   receiving, at the first UE, via radio resource control (RRC) signaling, through a first interface, a first sidelink configuration from a first cell during a handover procedure to a second cell, wherein the first sidelink configuration is configured by the second cell partly based on a second sidelink configuration stored at the first UE and received from the first cell and partly decided by the second cell; and
   exchanging, through a second interface, one or more sidelink packets with the second UE based on the first sidelink configuration received from the first cell during the handover procedure, wherein;
   the first interface is configurable to be one of a long term evolution (LTE) Uu interface and a new radio (NR) Uu interface, and
   the second interface is configurable to be one of an LTE PC5 interface and an NR PC5 interface.

2. The method of claim 1, wherein the first sidelink configuration comprises one or more Type 1 sidelink configured grant configurations comprising at least one of a time periodicity and locations of physical resource blocks in time and frequency domains, wherein exchanging the one or more sidelink packets with the second UE comprises transmitting the one or more sidelink packets to the second UE using a configured Type 1 sidelink configured grant after the first UE handovers to the second cell.

3. The method of claim 1, wherein the first sidelink configuration comprises one or more Type 2 sidelink configured grant configurations comprising at least a time periodicity in time domain.

4. The method of claim 1 further comprising:
   receiving a downlink control information (DCI) message from the second cell to activate at least a configured Type 2 sidelink configured grant received in the first sidelink configuration, wherein the DCI message comprises locations of physical resource blocks in time and frequency domains at the first interface, wherein exchanging the one or more sidelink packets with the second UE comprises transmitting the one or more sidelink packets to the second UE using the activated Type 2 sidelink configured grant.

5. The method of claim 1, wherein the first sidelink configuration comprises one or more sidelink Transmission (Tx) resource pool configurations, wherein exchanging the one or more sidelink packets with the second UE comprises transmitting the one or more sidelink packets to the second UE using a configured sidelink Tx resource pool after the first UE handovers to the second cell successfully.

6. The method of claim 1 further comprising:
   modifying at least part of the previously stored second sidelink configuration at the first UE based on the first sidelink configuration received from the first cell; and
   storing the modified sidelink configuration at the first UE, as a most recently updated sidelink configuration.

7. The method of claim 1 further comprising:
   exchanging, by the first UE, data and control signaling with the first cell and the second cell through different interfaces configured with different radio access technologies (RATs) comprising at least an LTE RAT and an NR RAT.

8. The method of claim 1, wherein the handover procedure comprises an inter-radio access technology (inter-RAT) handover procedure, wherein the first cell is an evolved-universal terrestrial radio access (E-UTRA) cell and the second cell is an NR cell.

9. The method of claim 8, wherein the first interface is an LTE Uu interface through which the first sidelink configuration is received from the E-UTRA cell and the second interface is the NR PC5 interface through which the one or more packets is exchanged with the second UE.

10. A first user equipment (UE) comprising:
    one or more non-transitory computer-readable media having computer-executable instructions for exchange sidelink packets with at least a second UE; and
    at least one processor coupled to the one or more non-transitory computer-readable media, and configured to execute the computer-executable instructions to:
    receive, at the first UE, via a radio resource control (RRC) signaling, through a first interface, a first sidelink configuration from a first cell during a handover procedure to a second cell, wherein the first sidelink configuration is configured by the second cell partly based on a second sidelink configuration stored at the first UE and received from the first cell and partly decided by the second cell; and
    exchange, through a second interface, one or more sidelink packets with the second UE based on the first sidelink configuration received from the first cell during the handover procedure, wherein:
    the first interface is configurable to be one of a long term evolution (LTE) Uu interface and a new radio (NR) Uu interface, and
    the second interface is configurable to be one of an LTE PC5 interface and an NR PC5 interface.

11. The first UE of claim 10, wherein the first sidelink configuration comprises one or more Type 1 sidelink configured grant configurations comprising at least one of a time periodicity and locations of physical resource blocks in time and frequency domains, wherein executing the computer-executable instructions to exchange the one or more sidelink packets with the second UE comprises executing the computer-executable instructions to transmit the one or more sidelink packets to the second UE using a configured Type 1 sidelink configured grant after the first UE handovers to the second cell.

12. The first UE of claim 10, wherein the first sidelink configuration comprises one or more Type 2 sidelink configured grant configurations comprising at least a time periodicity in time domain.

13. The first UE of claim 10, wherein the at least one processor is further configured to execute the computer-executable instructions to:
receive a downlink control information (DCI) message from the second cell to activate at least a configured Type 2 sidelink configured grant received in the first sidelink configuration, wherein the DCI message comprises locations of physical resource blocks in time and frequency domains at the first interface, wherein executing the computer-executable instructions to exchange the one or more sidelink packets with the second UE comprises executing the computer-executable instructions to transmit the one or more sidelink packets to the second UE using the activated Type 2 sidelink configured grant.

14. The first UE of claim 10, wherein the first sidelink configuration comprises one or more sidelink Transmission (Tx) resource pool configurations, wherein executing the computer-executable instructions to exchange the one or more sidelink packets with the second UE comprises executing the computer-executable instructions to transmit the one or more sidelink packets to the second UE using a configured sidelink Tx resource pool after the first UE handovers to the second cell successfully.

15. The first UE of claim 10, wherein the at least one processor is further configured to execute the computer-executable instructions to:
modify at least part of the previously stored second sidelink configuration at the first UE based on the first sidelink configuration received from the first cell; and
store the modified sidelink configuration at the first UE, as a most recently updated sidelink configuration.

16. The first UE of claim 10, wherein the at least one processor is further configured to execute the computer-executable instructions to:
exchange, by the first UE, data and control signaling with the first cell and the second cell through different interfaces configured with different radio access technologies (RATs) comprising at least an LTE RAT and an NR RAT.

17. The first UE of claim 10, wherein the handover procedure comprises an inter-radio access technology (inter-RAT) handover procedure, wherein the first cell is an evolved-universal terrestrial radio access (E-UTRA) cell and the second cell is an NR cell.

18. The first UE of claim 17, wherein the first interface is an LTE Uu interface through which the first sidelink configuration is received from the E-UTRA cell and the second interface is the NR PC5 interface through which the one or more packets is exchanged with the second UE.

19. A method for a first cell associated with a base station, the method for configuring a first user equipment (UE) to exchange sidelink packets with at least a second UE, the method comprising:
transmitting, from the first cell, via a radio resource control (RRC) signaling, through a first interface, a first sidelink configuration to the first UE during a handover procedure of the first UE from the first cell to a second cell, wherein:
the first sidelink configuration is configured by the second cell partly based on a second sidelink configuration stored at the first UE and received from the first cell and partly decided by the second cell,
the first sidelink configuration configures the first UE to exchange, through a second interface, one or more sidelink packets with the second UE,
the first interface is configurable to be one of a long term evolution (LTE) Uu interface and a new radio (NR) Uu interface, and
the second interface is configurable to be one of an LTE PC5 interface and an NR PC5 interface.

20. The method of claim 19, wherein the handover procedure comprises an inter-radio access technology (inter-RAT) handover procedure, wherein the first cell is an evolved-universal terrestrial radio access (E-UTRA) cell and the second cell is an NR cell.

* * * * *